United States Patent
Miyashita et al.

(10) Patent No.: US 12,337,235 B2
(45) Date of Patent: Jun. 24, 2025

(54) INFORMATION PROCESSING SYSTEM, INFORMATION PROCESSING METHOD, AND NON-TRANSITORY COMPUTER READABLE MEDIUM

(71) Applicant: CYGAMES, INC., Tokyo (JP)

(72) Inventors: Naoyuki Miyashita, Tokyo (JP); Yuki Suzuki, Tokyo (JP)

(73) Assignee: CYGAMES, INC., Tokyo (JP)

( * ) Notice: Subject to any disclaimer, the term of this patent is extended or adjusted under 35 U.S.C. 154(b) by 110 days.

(21) Appl. No.: 17/941,849

(22) Filed: Sep. 9, 2022

(65) Prior Publication Data

US 2023/0001296 A1 Jan. 5, 2023

Related U.S. Application Data

(63) Continuation of application No. PCT/JP2021/009817, filed on Mar. 11, 2021.

(30) Foreign Application Priority Data

Mar. 12, 2020 (JP) .................. 2020-043070

(51) Int. Cl.
*A63F 13/00* (2014.01)
*A63F 13/52* (2014.01)
*A63F 13/69* (2014.01)

(52) U.S. Cl.
CPC .............. *A63F 13/52* (2014.09); *A63F 13/69* (2014.09)

(58) Field of Classification Search
CPC ........... A63F 13/00; A63F 13/48; A63F 13/55
See application file for complete search history.

(56) References Cited

U.S. PATENT DOCUMENTS

| | | | |
|---|---|---|---|
| 6,666,770 B1 | 12/2003 | Kubo et al. | |
| 2015/0336004 A1* | 11/2015 | Shimizu | A63F 13/46 463/42 |

(Continued)

FOREIGN PATENT DOCUMENTS

| | | |
|---|---|---|
| JP | 2001-029656 A | 2/2001 |
| JP | 2017-185369 A | 10/2017 |
| JP | 6435521 B2 | 12/2018 |

OTHER PUBLICATIONS

International Search Report issued in PCT/JP2021/009817 on Apr. 6, 2021 (7 pages).

(Continued)

*Primary Examiner* — David L Lewis
*Assistant Examiner* — Eric M Thomas
(74) *Attorney, Agent, or Firm* — Osha Bergman Watanabe & Burton LLP

(57) ABSTRACT

An information processing system comprises a computer configured to execute: setting a first area and a second area as areas in which game media of a first player are disposed, the second area being different from the first area; setting a third area and a fourth area as areas in which game media of a second player are disposed, the fourth area being different from the third area; displaying the game media disposed in the first area, the second area, and the fourth area in an identifiable manner; displaying the game media disposed in the third area in an unidentifiable manner; setting a game medium disposed in the first area as a first base medium; setting a game medium disposed in an area where game media of the first player are disposed as a first material medium, the area being an area other than the second area; and fusing the first material medium with the first base medium to change the ability of the first base medium, while (Continued)

deleting the first material medium or changing the ability thereof.

6 Claims, 47 Drawing Sheets

(56) References Cited

U.S. PATENT DOCUMENTS

| | | | |
|---|---|---|---|
| 2016/0027260 A1* | 1/2016 | Pierce | G07F 17/3276 |
| | | | 463/7 |
| 2017/0169662 A1* | 6/2017 | Froy | G06Q 30/0261 |
| 2018/0304157 A1 | 10/2018 | Takatoku et al. | |

OTHER PUBLICATIONS

Written Opinion of the International Searching Authority issued in PCT/JP2021/009817 on Apr. 6, 2021 (4 pages).

Office Action issued in the counterpart Japanese Patent Application No. 2020-043070, mailed on Jul. 21, 2020 (10 pages).

Jianxin x, Detailed Explanation of the Mechanism and Effects of Shadow Verse Cards That Even Newbies Can Understand (Part1), https://www.bilibili.comopus30605604091 5213630, Oct. 3, 2019 (37 pages).

* cited by examiner

|  | Effect |
|---|---|
| Fanfare | Invoked when the card is placed into the field from the hand area. |
| Last_words | Invoked when the card is destroyed. |
| Protection | When the card having protection is present in the field, it is not possible to attack cards other than that card. |
| Rush | It is possible to attack a follower card in the turn in which the card is placed into the field. |
| Dash | It is possible to perform an attack in the turn in which the card is placed into the field. |
| Killer | When damage is given, the target is destroyed regardless of the remaining physical energy. |
| Drain | When damage is given by an attack, the physical energy of the player's leader is recovered. |
| Direct_summon | The card is placed into the field from the player's deck when a condition is satisfied. |
| When_evolved | Invoked when the card is evolved. |
| Fusion | The ability is enhanced when a card in the hand is stacked. |

FIG.7

| | Effect |
|---|---|
| Example 1 | Fanfare: Give X damage points to a follower card of the opponent. Randomly add X machine and nature cards from the deck to the hand. X is the number of cards fused. If machine or nature cards have been fused with this card, the costs of those cards are decreased by three. |
| Example 2 | Fanfare: Changes to "XXX" when a follower card is fused. Fanfare: Changes to "YYY" when a spell card is fused: Fanfare: Changes to "ZZZ" when an amulet card is fused. |
| Example 3 | Fanfare: Add X or add X to a follower card in the hand. X is the number of cards fused. |
| Example 4 | Fanfare: Recover the physical energy of the player's leader by X. X is the number of cards fused. |
| Example 5 | Fanfare: Give X damage points to the opponent's leader. X is the number of cards fused. |
| Example 6 | Fanfare: Place a card "DDD" into the field. Further place a card "EEE" into the field when two or more cards have been fused. Further place a card "FFF" into the field when five or more cards have been fused. |

FIG.17

INFORMATION PROCESSING SYSTEM, INFORMATION PROCESSING METHOD, AND NON-TRANSITORY COMPUTER READABLE MEDIUM

CROSS REFERENCE TO RELATED APPLICATIONS

This application is a continuation application of International Application No. PCT/JP2021/009817, filed on Mar. 11, 2021, which claims priority to Japanese Patent Application No. 2020-043070, filed on Mar. 12, 2020, the entire contents of which are incorporated by reference herein.

BACKGROUND ART

Technical Field

The present invention relates to information processing systems, information processing methods, and information processing programs.

Digital card games that allow remote battles among players have hitherto been proposed. Among such digital card games, there has been proposed a type of game configured such that a new card is summoned when a card placed in the field is fused with another card, for example, as disclosed in Patent Literature 1.

CITATION LIST

Patent Literature

Patent Literature 1: JP 6435521 B

SUMMARY OF INVENTION

Technical Problem

With games that allow battles, such as the one mentioned above, there is a demand for further enhancing strategic intricacy.

It is an object of the present invention to provide an information processing system, an information processing method, and an information processing program that make it possible to enhance strategic intricacy.

Solution to Problem

In order to solve the problem described above, an information processing system includes: an area setting unit that sets a first area and a second area as areas in which game media of a first player are disposed, the second area being different from the first area, and that sets a third area and a fourth area as areas in which game media of a second player are disposed, the fourth area being different from the third area; a display control unit that displays the game media disposed in the first area, the second area, and the fourth area in an identifiable manner and that displays the game media disposed in the third area in an unidentifiable manner; and a fusion processing unit that uses a game medium disposed in the first area as a base medium and a game medium disposed in an area where game media of the first player are disposed as a material medium, the area being an area other than the second area, and that fuses the material medium with the base medium to change the ability of the base medium, while deleting the material medium or changing the ability thereof.

The fusion processing unit may use a game medium disposed in the third area as a base medium and a game medium disposed in an area where game media of the second player are disposed as a material medium, the area being an area other than the fourth area, and may fuse the material medium with the base medium to change the ability of the base medium, while deleting the material medium or changing the ability thereof; and the display control unit may display the base medium and the material medium in an identifiable manner in the case where game media of the second player have been fused.

The abilities of the game media may include abilities that are referred to when the relevant game medium is disposed in the second area or the fourth area and abilities that are referred to when the relevant game medium is disposed in the first area or the third area; and the fusion may be an ability that is referred to when the relevant game medium is disposed in the first area.

In order to solve the problem described above, an information processing method includes: a step of setting a first area and a second area as areas in which game media of a first player are disposed, the second area being different from the first area, and setting a third area and a fourth area as areas in which game media of a second player are disposed, the fourth area being different from the third area; a step of displaying the game media disposed in the first area, the second area, and the fourth area in an identifiable manner and displaying the game media disposed in the third area in an unidentifiable manner; and a step of using a game medium disposed in the first area as a base medium and a game medium disposed in an area where game media of the first player are disposed as a material medium, the area being an area other than the second area, and fusing the material medium with the base medium to change the ability of the base medium, while deleting the material medium or changing the ability thereof.

In order to solve the problem described above, an information processing program causes a computer to function as: an area setting unit that sets a first area and a second area as areas in which game media of a first player are disposed, the second area being different from the first area, and that sets a third area and a fourth area as areas in which game media of a second player are disposed, the fourth area being different from the third area; a display control unit that displays the game media disposed in the first area, the second area, and the fourth area in an identifiable manner and that displays the game media disposed in the third area in an unidentifiable manner; and a fusion processing unit that uses a game medium disposed in the first area as a base medium and a game medium disposed in an area where game media of the first player are disposed as a material medium, the area being an area other than the second area, and that fuses the material medium with the base medium to change the ability of the base medium, while deleting the material medium or changing the ability thereof.

Effects of Disclosure

The present invention makes it possible to enhance strategic intricacy.

BRIEF DESCRIPTION OF DRAWINGS

FIG. 7 is a figure for explaining example skills.

FIG. 17 is a figure for explaining example effects of fusion as a skill.

DESCRIPTION OF EMBODIMENTS

An aspect of an embodiment of the present invention will be described below in detail with reference to the accompanying drawings. The numerical values, etc. given in this embodiment are merely examples for facilitating understanding, and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

(Overall Configuration of Information Processing System S)

Figure 1:
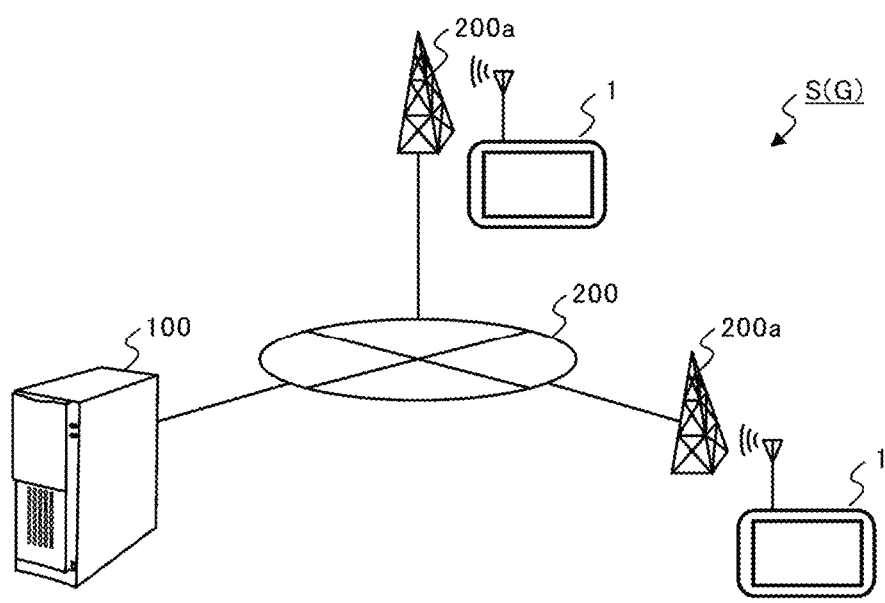
FIG. 1 is an explanatory illustration schematically showing the configuration of an information processing system.

FIG. 1 is an explanatory illustration schematically showing the configuration of an information processing system S. The information processing system S is what is called a client-server system including player terminals 1, a server 100, and a communication network 200 having communication base stations 200a.

The player terminals 1 can establish communication with the server 100 via the communication network 200. The player terminals 1 include a wide range of electronic appliances that are capable of communicatively connecting to the server 100 in a wireless or wired manner. Examples of the player terminals 1 include smartphones, mobile phones, tablet devices, personal computers, and game machines. This embodiment will be described in the context of a case where smartphones are used as the player terminals 1.

The server 100 is communicatively connected to the plurality of player terminals 1. The server 100 accumulates various kinds of information (player information) for each player who plays a game. Furthermore, the server 100 updates the accumulated information and controls the proceeding of the game on the basis of operations input from the player terminals 1.

The communication base stations 200a are connected to the communication network 200, and send information to and receive information from the player terminals 1 in a wireless manner. The communication network 200 is implemented by a mobile phone network, the Internet network, a local area network (LAN), a special circuit, or the like, and realizes wireless or wired communication connection between the player terminals 1 and the server 100.

In the information processing system S in this embodiment, the player terminals 1 and the server 100 function as game devices G. The player terminals 1 and the server 100 individually share roles for controlling the proceeding of the game, and it becomes possible to proceed with the game through cooperation between the player terminals 1 and the server 100.

(Hardware Configurations of Player Terminals 1 and Server 100)

Figure 2A:
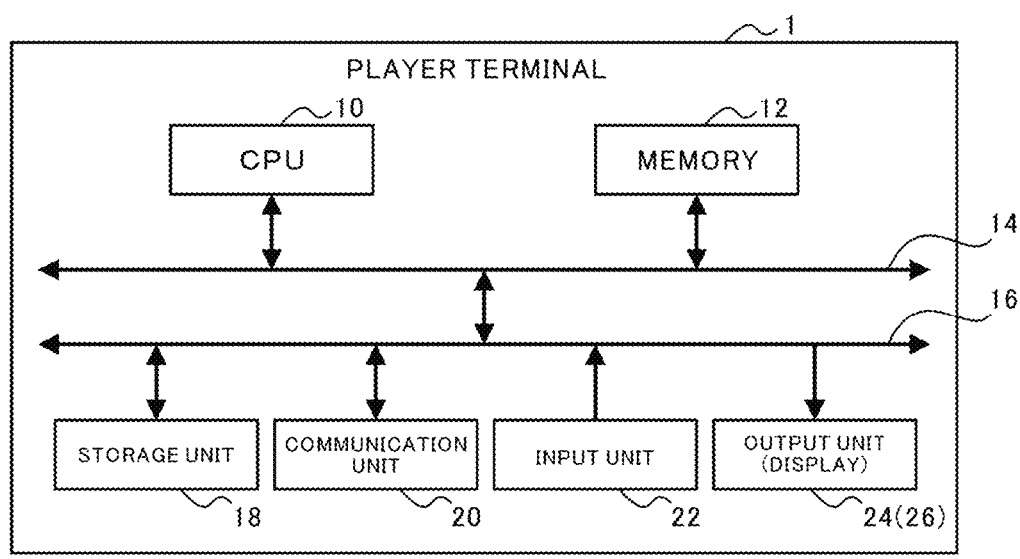
FIG. 2A is a diagram for explaining the hardware configuration of a player terminal.
Figure 2B:
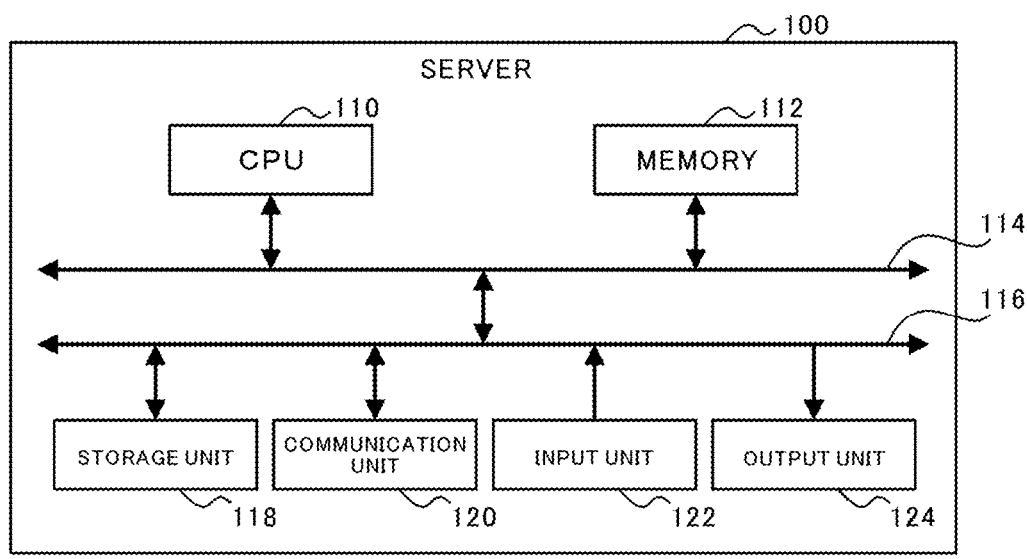
FIG. 2B is a diagram for explaining the hardware configuration of a server.

FIG. 2A is a diagram for explaining the hardware configuration of a player terminal 1. Furthermore, FIG. 2B is a diagram for explaining the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

Note that the configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24 of the player terminal 1, respectively. Therefore, the following description will be directed to the hardware configuration of the player terminal 1, while omitting a description of the server 100.

The CPU 10 runs a program stored in the memory 12 to control the proceeding of the game. The memory 12 is configured of a read only memory (ROM) or a random access memory (RAM), and stores the program and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory such as a dynamic random access memory (DRAM), and stores various kinds of programs and data. In the player terminal 1, the programs and data stored in the storage unit 18 are loaded into the memory 12 (RAM) by the CPU 10.

The communication unit 20 is communicatively connected to a communication base station 200a in a wireless manner, and sends information to and receives information from the server 100 via the communication network 200, such as various kinds of data and programs. In the player terminal 1, programs, etc. received from the server 100 are stored in the memory 12 or the storage unit 18.

The input unit 22 is configured of a unit via which player operations are input (operations are accepted), such as a touch panel, buttons, a keyboard, a mouse, a cross keypad, or an analog controller. Alternatively, the input unit 22 may be a special controller provided at the player terminal 1 or connected (externally) to the player terminal 1. Alternatively, the input unit 22 may be configured of an acceleration sensor that detects tilting or movement of the player terminal 1 or a microphone that detects player's voice. That is, examples of the input unit 22 include a wide range of devices that enable the input of player's intents in distinguishable manners.

The output unit 24 is configured to include a display device and a speaker. Note that the output unit 24 may be a device connected (externally) to the player terminal 1. In this embodiment, the player terminal 1 includes a display 26 as the output unit 24 and includes a touch panel as the input unit 22, the touch panel being provided so as to be stacked on the display 26.

(Game Specifics)

Next, the specifics of the game provided by the information processing system S (game devices G) in this embodiment will be described by using an example. The game in this embodiment is what is called a digital card game. A player can acquire and possess a plurality of kinds of digital cards (digital media, hereinafter simply referred to as cards) provided from an administrator through lotteries or the like, and can play a card battle game in which the player battles against a computer or another player by using the possessed cards. The following describes the specifics of the game in this embodiment in detail.

Figure 3A:
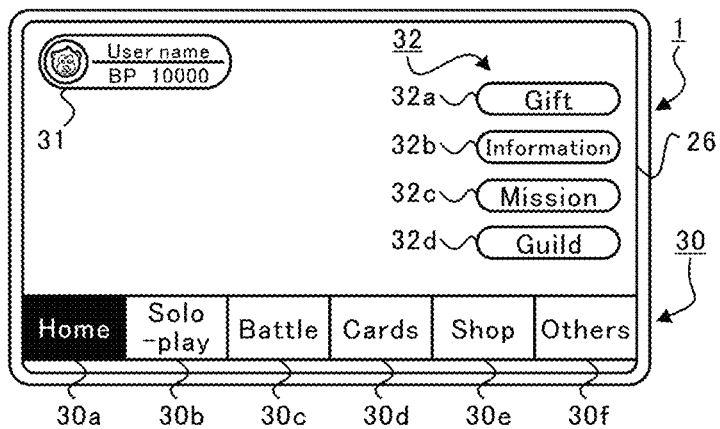
FIG. 3A is an illustration for explaining an example home screen.
Figure 3B:
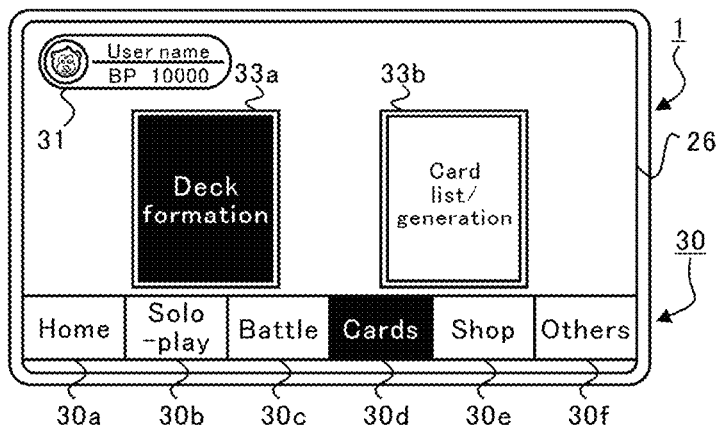
FIG. 3B is an illustration for explaining an example card setting screen.
Figure 3C:
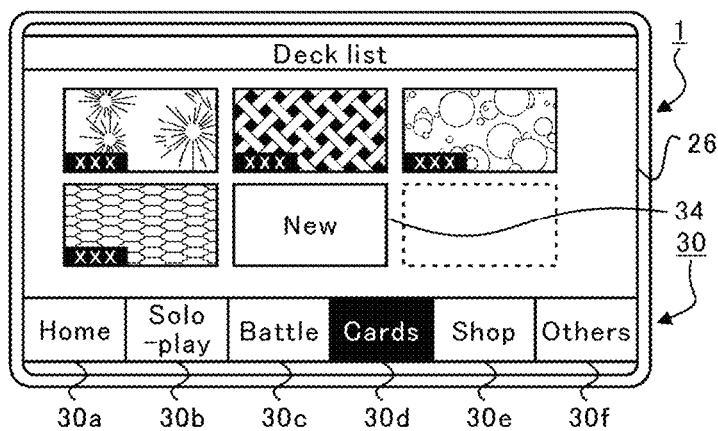
FIG. 3C is an illustration for explaining an example deck selection screen.
Figure 3D:
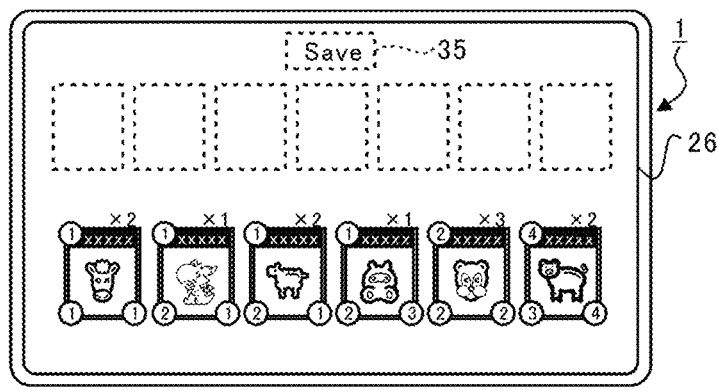
FIG. 3D is an illustration for explaining an example deck formation screen in an initial state.
Figure 4A:
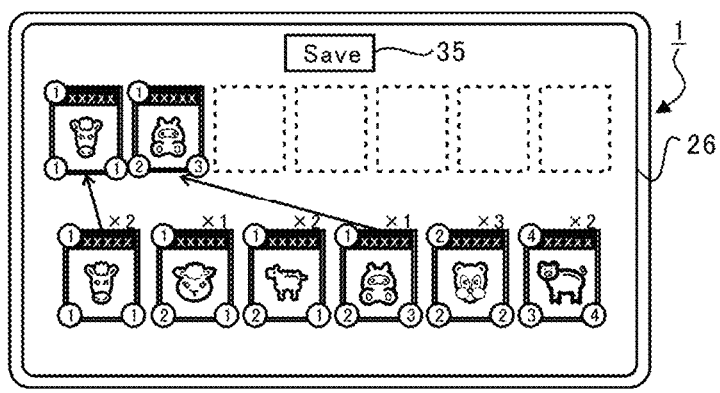
FIG. 4A is an illustration for explaining an example deck formation screen at the time of formation.
Figure 4B:
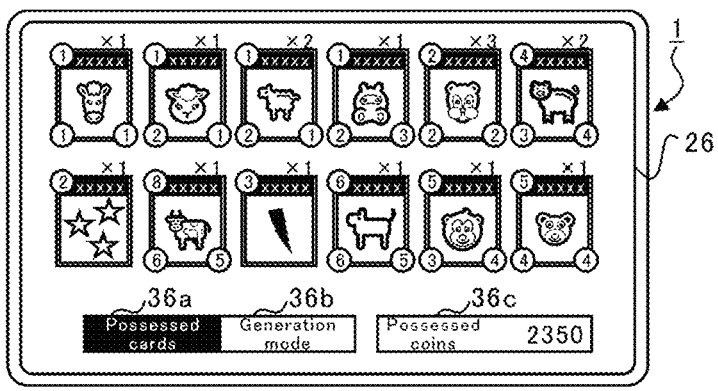
FIG. 4B is an illustration for explaining an example card list screen.
Figure 4C:
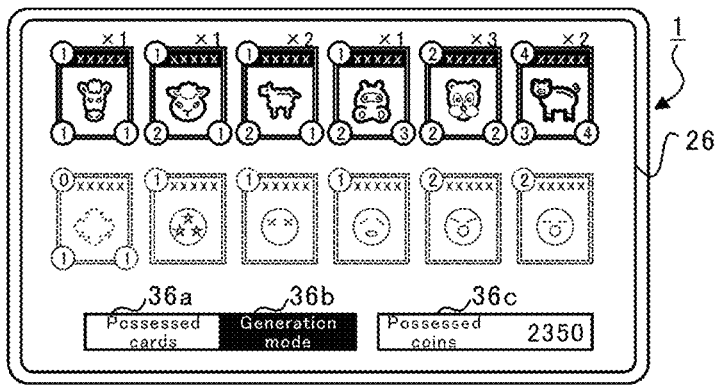
FIG. 4C is an illustration for explaining an example card generation screen.
Figure 4D:
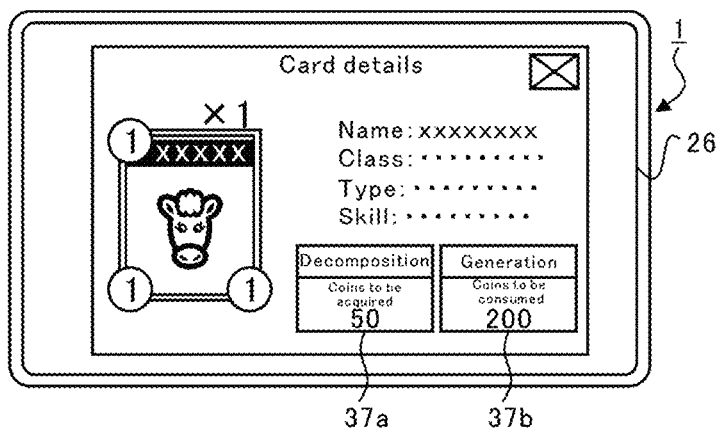
FIG. 4D is an illustration for explaining an example card detail screen.

FIG. 3A is an illustration for explaining an example home screen. FIG. 3B is an illustration for explaining an example card setting screen. FIG. 3C is an illustration for explaining an example deck selection screen. FIG. 3D is an illustration for explaining an example deck formation screen in an initial state. FIG. 4A is an illustration for explaining an example deck formation screen at the time of formation. FIG. 4B is an illustration for explaining an example card list screen. FIG. 4C is an illustration for explaining an example card generation screen. FIG. 4D is an illustration for explaining an example card detail screen.

When an application for the game is activated at the player terminal 1, communication is started between the player terminal 1 and the server 100, whereby the player terminal 1 enters a log-in state, and the game is started. At the start of the game, various game screens are displayed on the display 26 of the player terminal 1. In this embodiment, the game screens are broadly classified into normal screens and battle screens.

The normal screens are mainly screens for allowing the player to make various kinds of setting and to confirm information. Meanwhile, the battle screens are screens that are displayed on the display 26 from the start to the end of the card battle game. Here, all the screens other than the battle screens are the normal screens. A plurality of screens are provided as the normal screens, such as the home screen shown in FIG. 3A and the card setting screen shown in FIG. 3B, as well as a shop screen and a menu screen, which are not shown.

The home screen shown in FIG. 3A is the screen that is displayed first after log-in. As shown in FIG. 3A, in the home screen, a menu bar 30 is displayed in a lower part of the display 26. In the menu bar 30, a plurality of operating parts that can be operated (tapped) by the player are provided. In the menu bar 30, the following operating parts are provided: a home-screen selection operating part 30a labelled as "Home"; a solo-play selection operating part 30b labelled as "Solo play"; a multi-play selection operating part labelled as "Battle"; a card-setting-screen selection operating part 30d labelled as "Cards"; a shop-screen selection operating part 30e labelled as "Shop"; and a menu-screen selection operating part 30f labelled as "Others".

When the home-screen selection operating part 30a is tapped, the home screen shown in FIG. 3A is displayed on the display 26. Furthermore, when the solo-play selection operating part 30b is tapped, various kinds of setting screens are displayed, and when settings have been made in the setting screens, a card battle game in the form of a battle against the computer is started. When the multi-play selection operating part 30c is tapped, various kinds of setting screens are displayed, and when settings have been made in the setting screens, a card battle game in the form of a remote battle against another player is started. When the card-setting-screen selection operating part 30d is tapped, the card setting screen shown in FIG. 3B is displayed on the display 26, which makes it possible to form a deck, to display a list of cards, to decompose or generate a card, and so forth, as will be described later. Furthermore, when the shop-screen selection operating part 30e is tapped, a shop screen is displayed on the display 26, which makes it possible to acquire cards through lotteries by consuming an in-game currency or items. Furthermore, when the menu-screen selection operating part 30f is tapped, a menu screen is displayed on the display 26, which makes it possible to confirm the settings for the game and various kinds of information. Note that in the menu bar 30, in order to distinguish the screen currently displayed on the display 26, the operating part corresponding to each screen is displayed in a highlighted manner.

At the top left of the home screen shown in FIG. 3A, a header display area 31 is provided. In the header display area 31, a player name, a player icon, and battle points (BP) associated with a player ID are displayed. The battle points can be acquired when the player wins in a card battle game in the form of a remote battle against another player, and are decreased when the player is defeated in a card battle game in the form of a remote battle against another player.

At the right end of the home screen, a home menu 32 is displayed. In the home menu 32, the following selection operating parts are provided: a gift-screen selection operating part 32a labelled as "Gift"; an information-screen selection operating part 32b labelled as "Information"; a mission-screen selection operating part 32c labelled as "Mission"; and a guild-screen selection operating part 32d labelled as "Guild".

When the gift-screen selection operating part 32a is tapped, for example, a gift screen (not shown) displaying items distributed from the administrator is displayed on the display 26. Furthermore, when the information-screen selection operating part 32b is tapped, an information screen (not shown) displaying update information, maintenance information, etc. is displayed on the display 26. Furthermore, when the mission-screen selection operating part 32c is tapped, a mission screen (not shown) displaying preset missions is displayed on the display 26. Furthermore, when the guild-screen selection operating part 32d is tapped, a guild screen concerning a guild (group) constituted of a plurality of players is displayed on the display 26.

The card setting screen shown in FIG. 3B is displayed on the display 26 when the card-setting-screen selection operating part 30d is tapped. In the card setting screen, a deck formation tab 33a and a card-list generation tab 33b are displayed. When the deck formation tab 33a is tapped, the deck selection screen shown in FIG. 3C is displayed. In the deck selection screen, a list of decks formed by the player is displayed. The player can edit the deck name when forming a deck. In the deck selection screen, a deck name is displayed at an icon corresponding to each deck.

Furthermore, in the deck selection screen, a deck creation tab 34 labelled as "New" is displayed. When the deck creation tab 34 is tapped by the player, the deck formation screen shown in FIG. 3D is displayed on the display 26, which makes it possible to newly form a deck.

In the deck formation screen, a plurality of blank fields are displayed in an upper row, and cards possessed by the player (hereinafter referred to as possessed cards) are displayed in a lower row. Furthermore, in the deck formation screen, when a possessed card displayed in the lower row is slid to the upper row, the slid possessed card is disposed in a blank field in the upper row, as shown in FIG. 4A. The possessed card disposed in the upper row in the deck formation screen, as described above, enters a tentatively registered state. Furthermore, when a save tab 35 labelled as "Save" and provided in the deck formation screen is tapped, deck information is stored. As the deck information, a deck ID is assigned, and card set information that makes it possible to identify all the tentatively registered possessed cards is stored in association with the deck ID. Note that, although not shown, when the save tab 35 is tapped, a screen for editing the deck name is displayed, and the editing of the deck name is finished, the deck name as well as an icon displayed in the deck selection screen, etc. are stored in association with the deck ID together with the card set information.

Furthermore, the deck formation screen is also displayed in the case where an icon is tapped in the deck selection screen shown in FIG. 3C, as shown in FIG. 4A. In this case, however, the cards constituting the deck selected in the deck selection screen are displayed in the upper row, and the possessed cards are displayed in the lower row. In this case, it is possible, through player operations, to change cards displayed in the upper row with possessed cards displayed in the lower row.

Note that, in the card battle game, a specified number of cards (e.g., 40 cards) are used. Therefore, in the deck formation screen, usually, the save tab 35 is tapped after the specified number of possessed cards are tentatively registered through player operations, whereby deck information including card set information of the specified number of cards is stored. Note that although it is possible to save deck information even in the case where the number of tentatively registered cards is less than the specified number of cards and in the case where the number of tentatively registered cards is greater than the specified number of cards, it is not possible to use the deck information in the card battle game.

When the card-list generation tab 33b is tapped in the card setting screen, the card list screen shown in FIG. 4B is displayed on the display 26. In the card list screen, a possessed card tab 36a, a generation mode tab 36b, and a possessed-coin display field 36c are provided in a lower section of the display 26. The possessed card tab 36a and the generation mode tab 36b are configured so that tap operations by the player can be accepted. The possessed card tab 36a and the generation mode tab 36b are also displayed in the card generation screen. When the possessed card tab 36a is tapped, the card list screen shown in FIG. 4B is displayed, and when the generation mode tab 36b is tapped, the card generation screen shown in FIG. 4C is displayed. Meanwhile, in the possessed-coin display field 36c, the number of coins possessed by the player (the number of possessed coins) is displayed, where the coins are the in-game currency.

As shown in FIG. 4B, in the card list screen, the possessed cards of the player, as well as the number of possessed cards, are displayed. Note that cards not possessed by the player may be displayed in the card list screen. Furthermore, in the card generation screen, all the cards provided are displayed regardless of whether or not those cards are possessed by the player, as shown in FIG. 4C. Note, however, that the cards possessed by the player are displayed in color, whereas the cards not possessed by the player are displayed in a grayed-out mode (indicated by broken lines in FIG. 4C). This makes it possible for the player to readily distinguish whether or not each card is a card possessed by the player himself or herself.

When each card is tapped in the card list screen and the card generation screen, a card detail screen is displayed, as shown in FIG. 4D. In the card detail screen, various kinds of information concerning the tapped card are displayed, and a decomposition tab 37a and a generation tab 37b are provided. In the decomposition tab 37a, the number of coins to be acquired is displayed. When the decomposition tab 37a is tapped, the card currently selected is decomposed, and the player can acquire the number of coins to be acquired, displayed in the decomposition tab 37a. Note that in the case where a card is decomposed, the number of possessed cards corresponding to that card decreases.

Furthermore, in the generation tab 37b, the number of coins to be consumed is displayed. When the generation tab 37b is tapped, it is possible to generate the card currently selected by consuming the number of coins to be consumed, displayed in the generation tab 37b. Upon the generation of the card, the number of possessed cards corresponding to that card increases. That is, the player can change possessed coins into a card by tapping the generation tab 37b. The card generation function described above can be executed regardless of whether or not the player possesses that card. That is, the player can generate cards corresponding to both cards that are possessed and cards that are not possessed.

Note that the cards that are provided may include cards that can be generated and cards that cannot be generated, or all the cards may be cards that can be generated. Furthermore, the cards that are provided may include cards having set therefor periods in which those cards can be generated and periods in which those cards cannot be generated.

Next, the card battle game will be described. In the following, an overview of the card battle game will first be described, and then the details of cards and the details of the card battle game will be described in order. Here, the descriptions will be given in the context of a card battle game in which a player battles against another player. Furthermore, in the following, the other player serving as the opponent of the battle will be referred to as the opponent.

Figure 5:
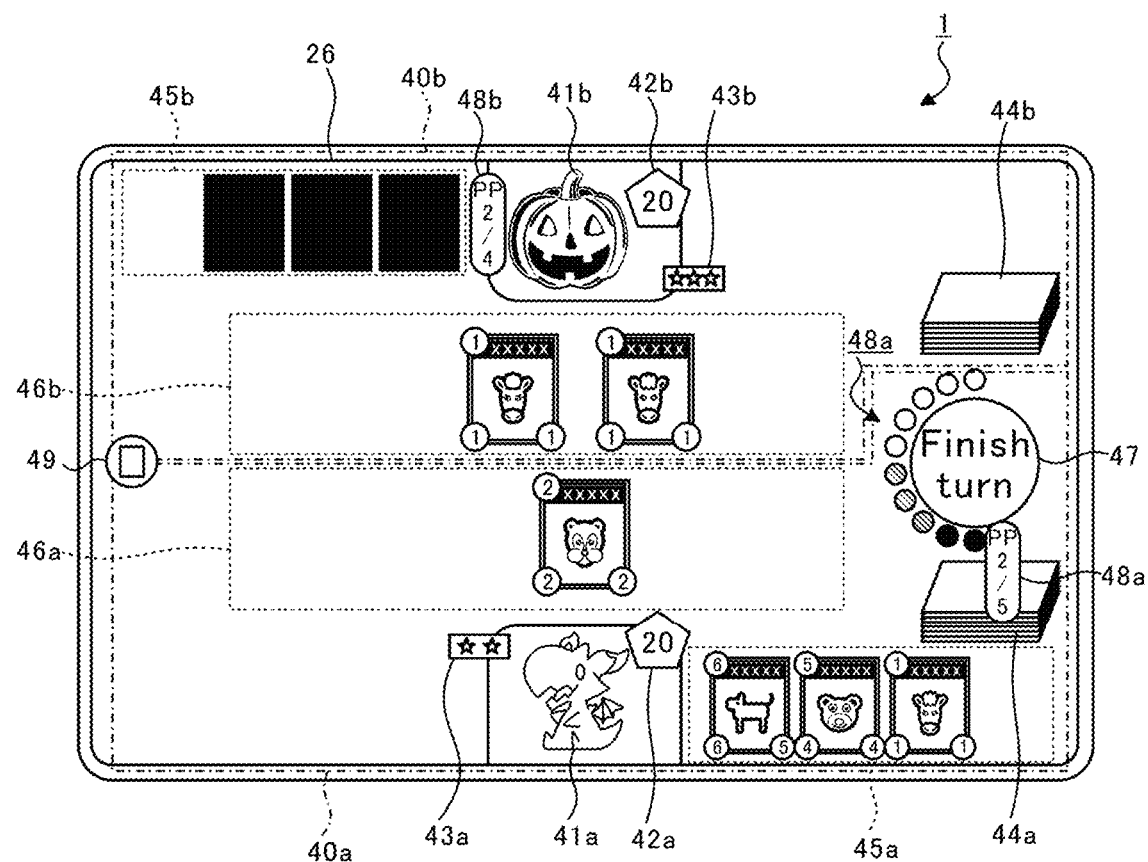
FIG. 5 is an illustration for explaining an example card battle game screen.

FIG. 5 is an illustration for explaining an example card battle game screen. The card battle game is started after the multi-play selection operating part 30c of the menu bar 30 is tapped, various kinds of setting screens are displayed, and settings are made in the setting screen. While the card battle game is being executed, the battle screen shown in FIG. 5 is displayed on the display 26.

The battle screen is divided into a player's display area 40a, in which cards, information, etc. of the player (first player) are displayed, and an opponent's display area 40b, in which cards, information, etc. of the opponent (second player) are displayed. In a lower middle section of the player's display area 40a, a player's leader 41a is displayed, and physical energy 42a and evolution points 43a of the player's leader 41a are displayed in the vicinity of the player's leader 41a. Similarly, in an upper middle section of the opponent's display area 40b, an opponent's leader 41b is displayed, and physical energy 42b and evolution points 43b of the opponent's leader 41b are displayed in the vicinity of the opponent's leader 41b. The physical energy 42a of the player's leader 41a and the physical energy 42b of the opponent's leader 41b are set to 20 as initial values.

Furthermore, in the player's display area 40a, a player's deck area 44a is provided at the right end, a player's hand area 45a (first area) is provided at the bottom right, and a player's field 46a (second area) is provided in the middle. In the deck area 44a, player's cards that are not being used are disposed in a closed state (in an unidentifiable state). In the hand area 45a, cards serving as the player's hand are disposed in a manner identifiable for the player. In the field 46a, cards, etc. placed out of the hand area 45a are disposed in a manner identifiable for the player.

Similarly, in the opponent's display area 40b, an opponent's deck area 44b is provided at the right end, an opponent's hand area 45b (third area) is provided at the top left, and an opponent's field 46b (fourth area) is provided in the middle. In the deck area 44b, opponent's cards that are not being used are disposed in a closed state. In the hand area 45b, cards serving as the opponent's hand are disposed in a manner unidentifiable for the player (disposed face down). In the field 46b, cards, etc. placed out of the hand area 45b are disposed in a manner identifiable for the player.

At the top right of the player's display area 40a, a turn end button 47 for accepting tapping by the player and a play-points displaying part 48a displaying the play points (PP) of the player are provided. The play-points displaying part 48a displays the maximum play points in the current turn as the denominator and the available play points as the numerator, and the maximum play points and the available play points are displayed distinguishably on the basis of the display mode of circles. Furthermore, in the vicinity of the leader 41b in the opponent's display area 40b, a play-points displaying part 48b displaying the play points of the opponent is provided.

Furthermore, at the left end of the battle screen, a battle log button 49 is provided. The battle log button 49 is provided so that a tap operation by the player can be accepted. When the battle log button 49 is tapped, a battle log, which will be described later, is displayed in a manner superimposed on the battle screen.

The card battle game in this embodiment is of the two-player battle type, and cards that serve as the player's hand are distributed at random from a deck selected by the player. Furthermore, similarly for the opponent, cards that serve as the opponent's hand are distributed at random from a deck selected by the opponent. Furthermore, in the card battle game, player's turns and opponent's turns are repeated alternately. In each turn, a card selected at random from the deck is added to the hand. In his or her own turn, according to prescribed rules, the player selects a follower card or an amulet card, which will be described later, from cards disposed in his or her own hand area 45a and places the card into the field 46a, or invokes a prescribed effect by using a spell card. In the following, placing a follower card or an amulet card disposed in the hand area 45a or 45b into the field 46a or 46b or invoking a prescribed effect by using a spell card disposed in the hand area 45a or 45b, i.e., moving a card disposed into the hand area 45a or 45b into another area, will be referred to as "playing".

In the card battle game, the player's leader 41a and the opponent's leader 41b respectively have the physical energy 42a and the physical energy 42b set therefor, and the player who has first decreased the physical energy 42a or 42b of the opponent in the battle through attacks using cards or the like wins the battle.

Figure 6A:
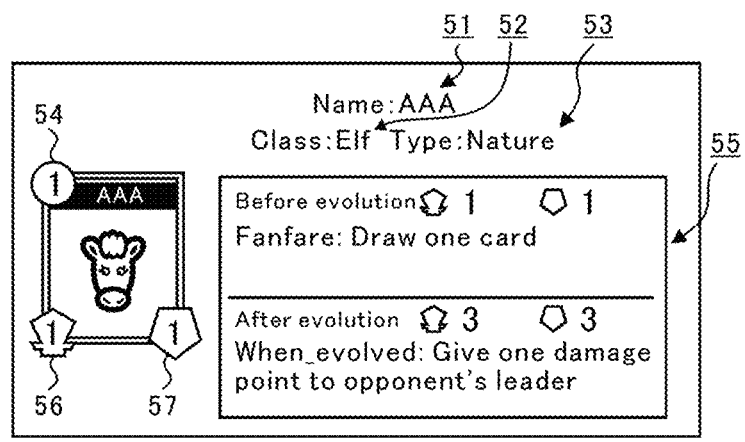
FIG. 6A is an illustration for explaining an example follower card.
Figure 6B:
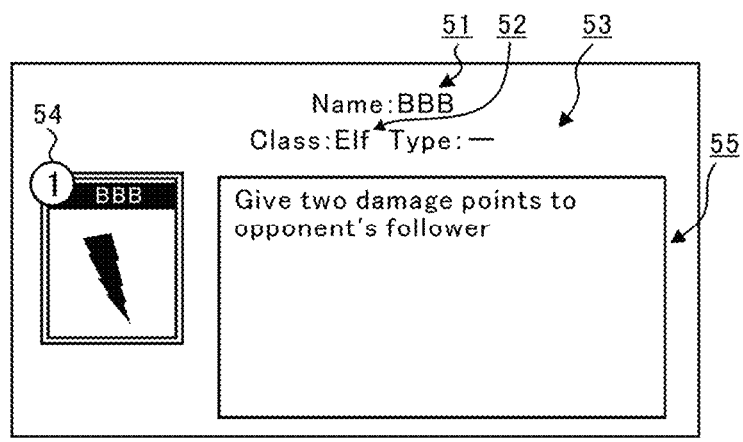
FIG. 6B is an illustration for explaining an example spell card.
Figure 6C:
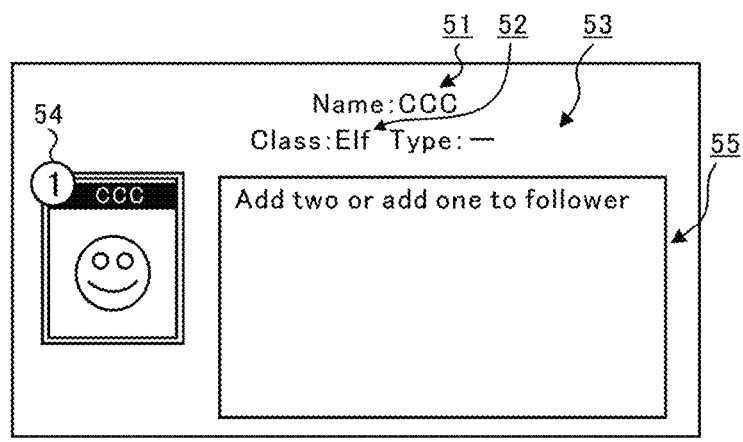
FIG. 6C is an illustration for explaining an example amulet card.

FIG. 6A is an illustration for explaining an example follower card. FIG. 6B is an illustration for explaining an example spell card. FIG. 6C is an illustration for explaining an example amulet card. Next, details of cards used in the card battle game in this embodiment will be described. The cards used in the card battle game in this embodiment are each classified into one of the following card types: a follower card, a spell card, and an amulet card.

As shown in FIGS. 6A to 6C, irrespective of the card type, each card has set therefor a name 51, a class 52, a type 53, and a cost 54. The name 51 is set uniquely for each card. As the class 52, a plurality of kinds of classes are provided, and each card is classified into one of those classes. As the type 53, a plurality of kinds of types are provided, and each card is classified into one of those types or is not classified into any of those types. The cost 54 indicates play points needed for playing, and it becomes possible to play the card by consuming play points corresponding to the cost.

The follower card shown in FIG. 6A is a card with which it is possible to attack the opponent's leader 41*b* and follower cards disposed in the opponent's field 46*b* in the card battle game. Each follower card has set therefor a name 51, a class 52, a type 53, a cost 54, skills 55, an attacking ability 56, and physical energy 57. The attacking ability 56 indicates the amount of damage that is given to the opponent's leader 41*b* or a follower card disposed in the opponent's field 46*b*, serving as the target of attack, when an attack is performed with the follower card. The physical energy 57 decreases by the amount of damage received when the follower card is damaged, and the follower card is destroyed when the physical energy 57 has become zero. The destroyed card is no longer displayed in the field 46*a* and is sent to a graveyard, which is not shown. Note, however, that as a state in which a card becomes no longer displayed in the field 46*b*, there is also a state of vanishing, in which the card is not sent to a graveyard, as opposed to destruction.

Furthermore, it is possible to evolve a follower card by consuming the evolution points 43*a* or 43*b*. For the evolved follower card, the attacking ability 56 and the physical energy 57 are increased, or a prescribed skill 55 is added. That is, when a follower card is evolved, the ability (the skills 55, the attacking ability 56, and the physical energy 57) of the card is enhanced.

The spell card shown in FIG. 6B has set therefor a name 51, a class 52, a type 53, a cost 54, and skills 55. When the spell card is played, the skills 55 (effects) are invoked, and the spell card is destroyed. That is, the spell card is a card that cannot be placed into the field 46*a* or 46*b*.

The amulet card shown in FIG. 6C has set therefor a name 51, a class 52, a type 53, a cost 54, and skills 55. The amulet card is a card that stays in the field 46*a* and whose skills 55 are invoked when it is played.

FIG. 7 is a figure for explaining example skills 55. Note that the skills 55 shown in FIG. 7 are examples, and other skills 55 may be provided, or some of the skills 55 may be omitted. Furthermore, although player's cards are assumed in the description here, the same applies to opponent's cards.

As shown in FIG. 7, as the skills 55, fanfare, last_words, protection, rush, dash, killer, drain, direct_summon, when_evolved, fusion, etc. are provided. Fanfare is a skill with which the effect specified after "Fanfare" is invoked when a card is placed (a card is played) from the hand area 45*a* into the field 46*a*. For example, with the example of the follower card shown in FIG. 6A, in the case where the follower card is placed in the field 46*a*, the effect "draw one card" is invoked, one card is determined through a lottery from the cards disposed in the deck area 44*a*, and the determined card is placed in the hand area 45*a*.

Last_words is a skill with which the effect specified after "Last_words" is invoked when the card is destroyed. Protection is a skill with which, in the case where a card for which protection is set is placed in the field 46*a*, the opponent is prohibited from attacking cards other than the card for which protection is set. Rush is a skill with which, in the turn in which the card is placed into the field 46*a*, it is possible to attack the follower cards of the opponent. Dash is a skill with which, in the turn in which the card is placed in the field 46*a*, it is possible to attack the follower cards and the leader 41*b* of the opponent. Killer is a skill with which, in the case where damage is given to a follower card of the opponent by performing an attack, it is possible to destroy the follower card of the opponent regardless of the physical energy of the follower card of the opponent. Drain is a skill with which, in the case where damage is given to a follower card or the leader 41*b* of the opponent in a player's turn, the physical energy 42*a* of the player's leader 41*a* is recovered by an amount corresponding to the given damage. Direct_summon is a skill with which a card is placed directly from the deck area 44*a* into the field 46*a* in the case where a preset condition is satisfied. When_evolved is a skill with which the effect specified after "When_evolved" is invoked when a follower card is evolved. Fusion is a skill conferred to a base card (base medium) that serves as a base of fusion, as will be described later in detail. Fusion is a skill with which a card disposed in the hand area 45*a* and satisfying a preset condition is fused as a material card (material medium), thereby enhancing (changing the ability of) that card. Note that there are cases where one card has a plurality of skills 55 set therefor in a multiplexed manner, and there are also cases where one card has no skills 55 set therefor.

Furthermore, in this embodiment, a deck is formed by combining follower cards, spell cards, and amulet cards, and the card battle game is played by using the deck formed. The following describes details of the card battle game.

Figure 8A:
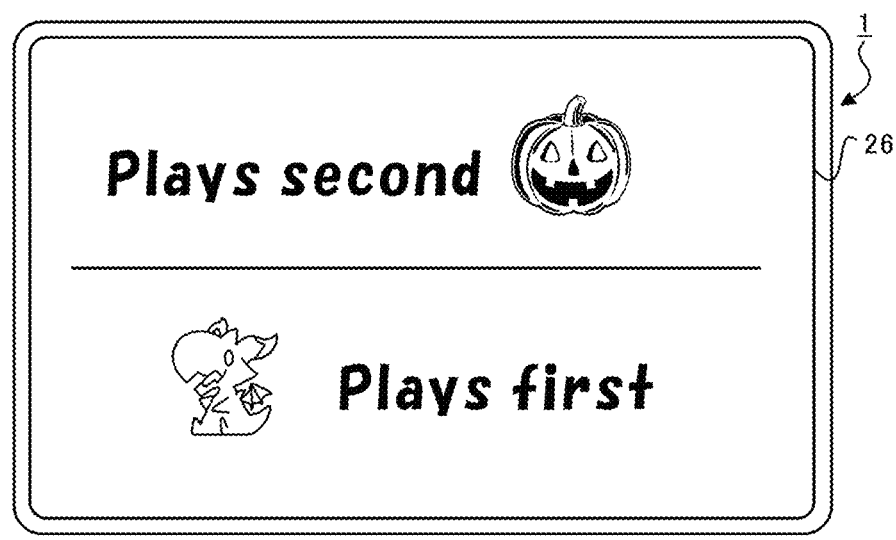
FIG. 8A is a first illustration for explaining an example card-battle-screen transition.
Figure 8B:
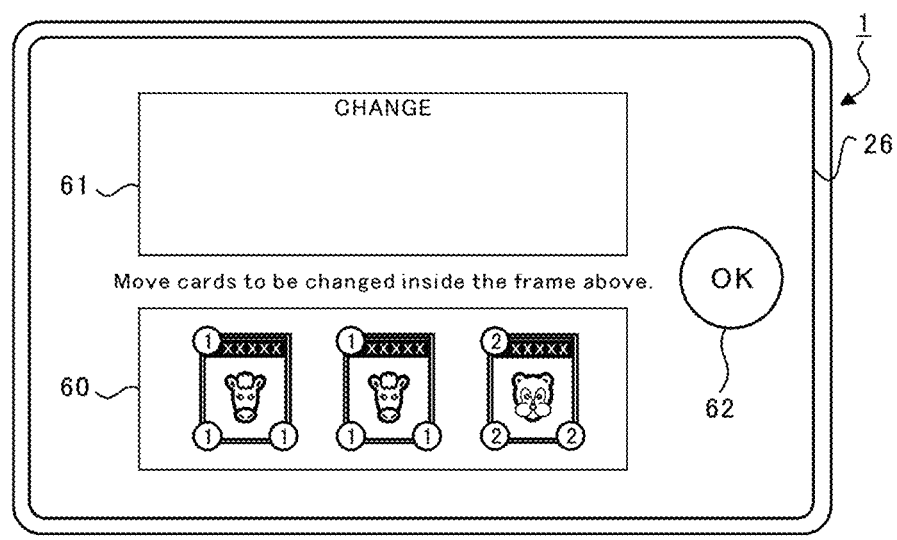
FIG. 8B is a second illustration for explaining an example card-battle-screen transition.
Figure 8C:
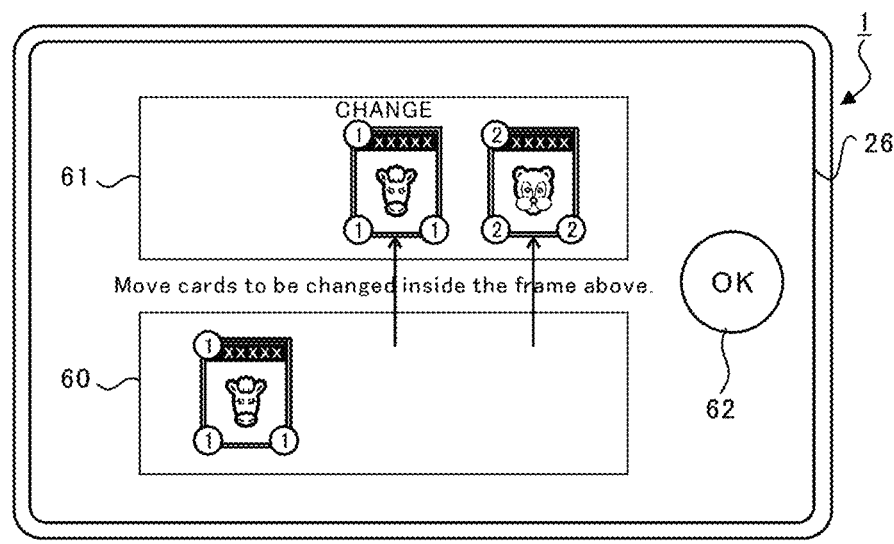
FIG. 8C is a third illustration for explaining an example card-battle-screen transition.
Figure 9A:
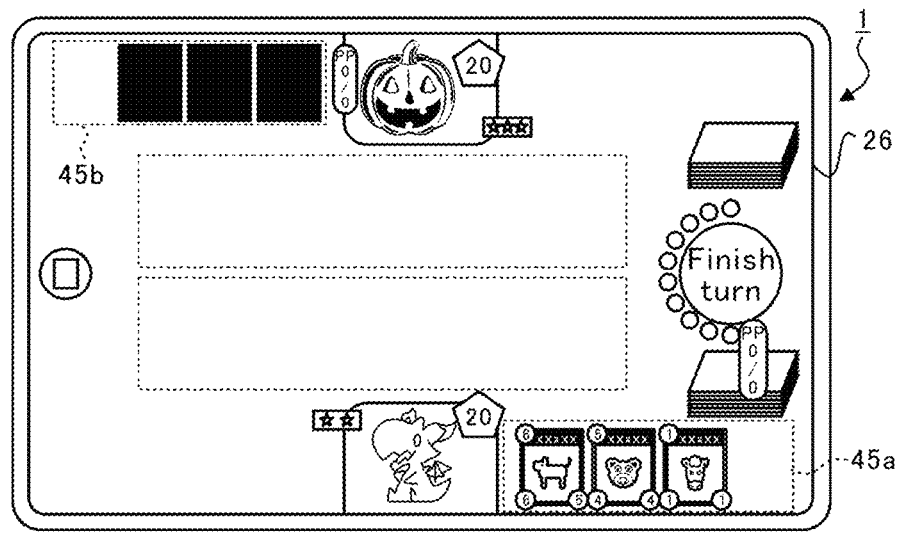
FIG. 9A is a fourth illustration for explaining an example card-battle-screen transition.
Figure 9B:
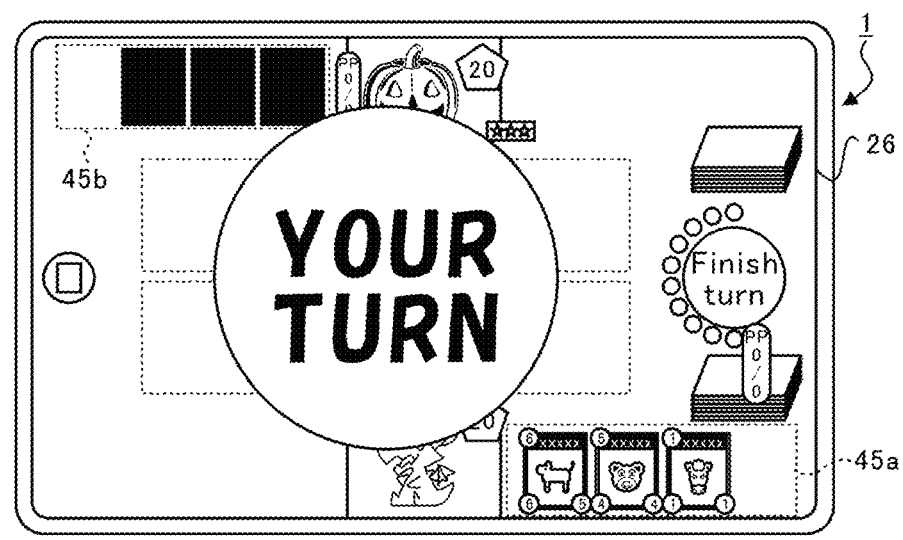
FIG. 9B is a fifth illustration for explaining an example card-battle-screen transition.
Figure 9C:
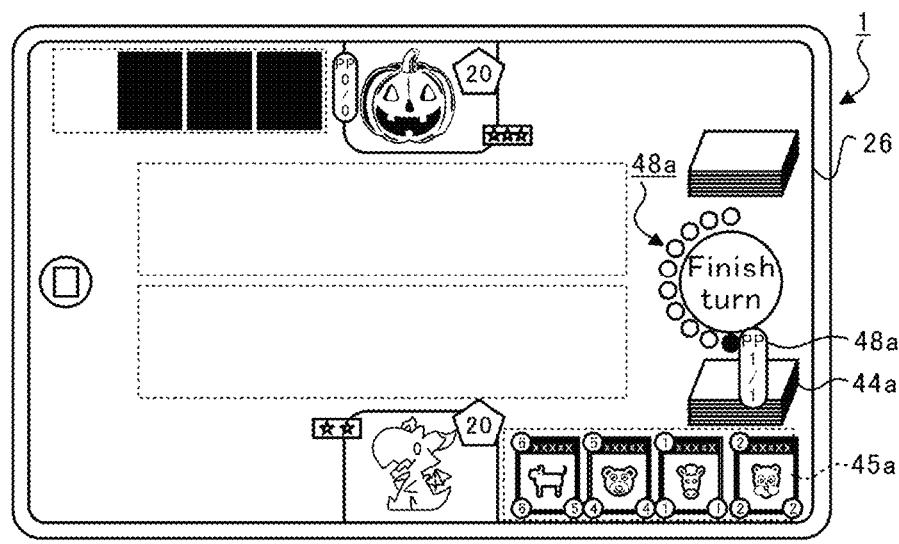
FIG. 9C is a sixth illustration for explaining an example card-battle-screen transition.
Figure 10A:
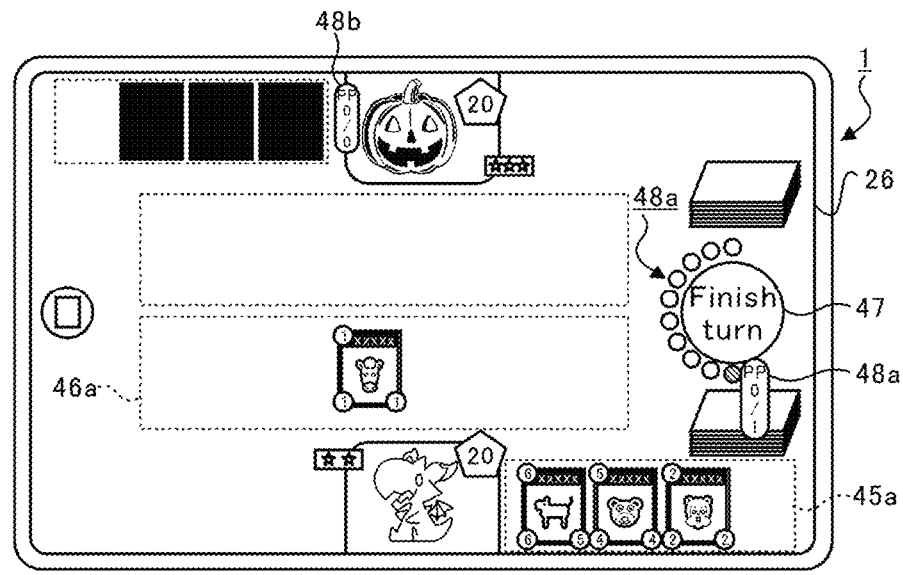
FIG. 10A is a seventh illustration for explaining an example card-battle-screen transition.
Figure 10B:
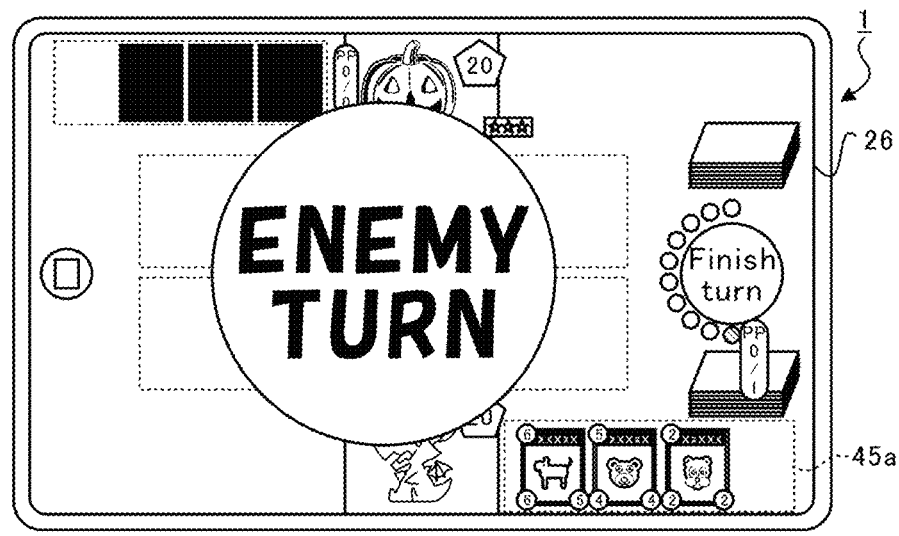
FIG. 10B is an eighth illustration for explaining an example card-battle-screen transition.
Figure 10C:
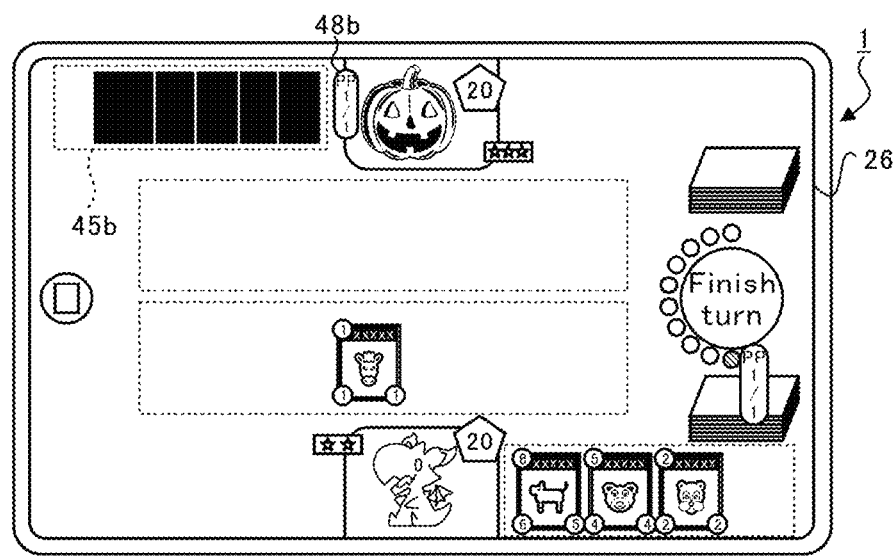
FIG. 10C is a ninth illustration for explaining an example card-battle-screen transition.
Figure 11A:
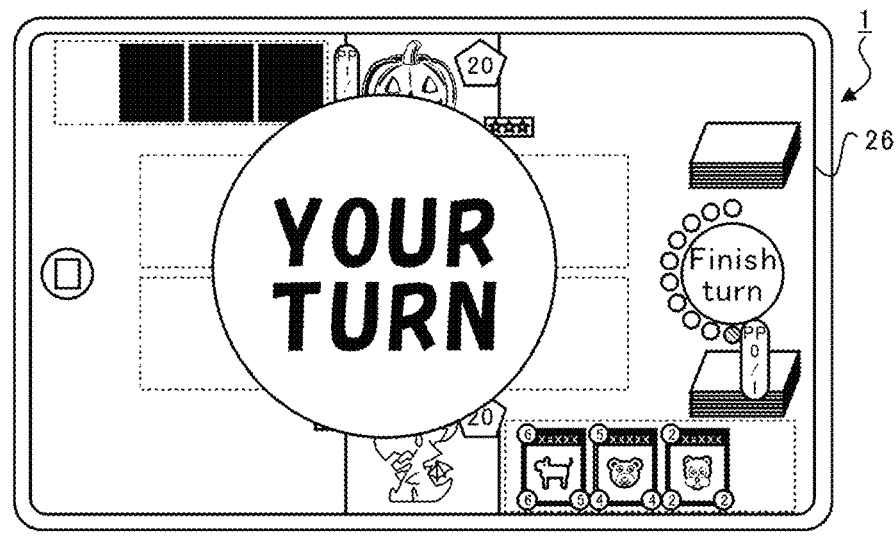
FIG. 11A is a tenth illustration for explaining an example card-battle-screen transition.
Figure 11B:
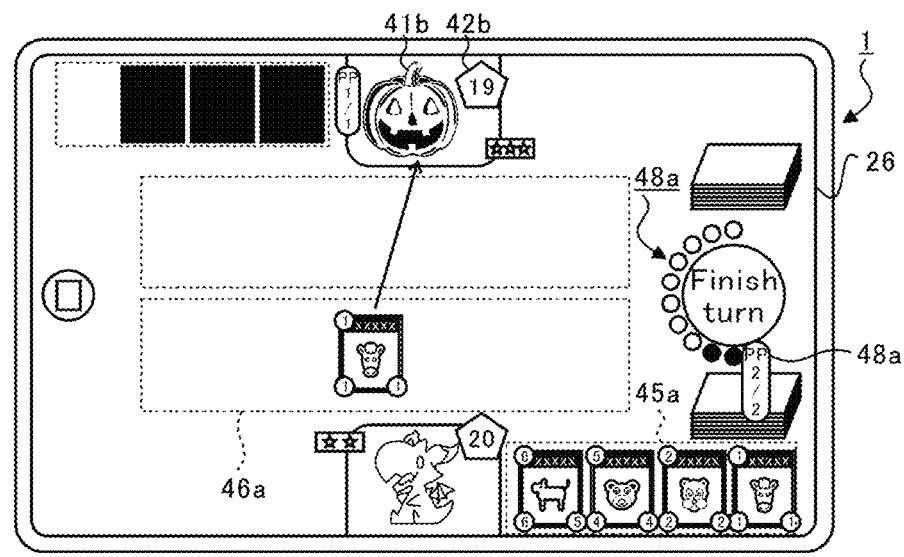
FIG. 11B is an eleventh illustration for explaining an example card-battle-screen transition.

FIG. 8A is a first illustration for explaining an example card-battle-screen transition. FIG. 8B is a second illustration for explaining an example card-battle-screen transition. FIG. 8C is a third illustration for explaining an example card-battle-screen transition. FIG. 9A is a fourth illustration for explaining an example card-battle-screen transition. FIG. 9B is a fifth illustration for explaining an example card-battle-screen transition. FIG. 9C is a sixth illustration for explaining an example card-battle-screen transition. FIG. 10A is a seventh illustration for explaining an example card-battle-screen transition. FIG. 10B is an eighth illustration for explaining an example card-battle-screen transition. FIG. 10C is a ninth illustration for explaining an example card-battle-screen transition. FIG. 11A is a tenth illustration for explaining an example card-battle-screen transition. FIG. 11B is an eleventh illustration for explaining an example card-battle-screen transition.

Upon the start of the card battle game, deck information that is used is transmitted from the player terminal 1 to the server 100. Note that deck information is also transmitted from the player terminal 1 of the opponent to the server 100. The server 100 randomly determines who plays first and who plays second, and randomly assigns indices (e.g., numbers 1 to 40) to all the cards represented by the deck information. Furthermore, the server 100 determines three initial candidate cards as well as three change candidate cards from the cards represented by the deck information.

Then, the server 100 transmits the following information to the player terminal 1: play order information indicating who plays first and who plays second; index information representing the indices of player's cards; and change information representing the initial cards and change candidate cards. At the player terminal 1, at the start of the card battle game, on the basis of the play order information, whether the player plays first or second is displayed on the display 26, as shown in FIG. 8A. Then, at the player terminal 1, on the basis of the change information, the three initial candidate cards are disposed in an initial card display area 60, and a change display area 61 for disposing cards to be changed is displayed on the display 26, as shown in FIG. 8B.

In the case where there is any card that the player wishes to change among the initial candidate cards, the player moves the card to be changed into the change display area 61 by performing a slide operation, as shown in FIG. 8C. Then, when an OK button 62 is tapped by the player, the card moved to the change display area 61 is returned to the deck area 44*a*, the unchanged initial candidate cards as well as the number of change candidate cards corresponding to the number of changed initial candidate cards are determined as initial cards, and initial card information representing the determined initial cards is transmitted to the server 100. Note that the server 100 also receives initial card information from the player terminal 1 of the opponent. Upon receiving initial card information from both player terminals, the server 100 transmits, to the player terminal 1 of the player, number-of-cards information representing only the number of cards included in the initial card information of the opponent. Similarly, upon receiving initial card information from both player terminals, the server 100 transmits, to the player terminal 1 of the opponent, number-of-cards information representing only the number of cards included in the initial card information of the player.

Upon receiving the number-of-cards information, the player terminal 1 displays a battle screen on the display 26, as shown in FIG. 9A. At this time, the determined initial cards are disposed in the hand area 45*a* in an identifiable manner, and three cards are disposed in the hand area 45*b* in an unidentifiable manner on the basis of the received number-of-cards information of the opponent.

Then, in the case where the player plays first, the player terminal 1 displays an image labelled as "YOUR TURN" on the display 26, indicating a player's turn, as shown in FIG. 9B, and then determines one index of a card present in the deck area 44*a* through a lottery. That is, here, a card present in the deck area 44*a* is picked up through a lottery. Then, the player terminal 1 disposes the card determined through the lottery in the hand area 45*a*, as shown in FIG. 9C, and transmits the card information to the server 100. Furthermore, the player terminal 1 adds one to the play points, and updates and displays the play-points displaying part 48*a* (here, sets the play points to one).

Then, in the case where, for example, the player places a follower card with a cost of one into the field 46*a* by performing a slide operation from among the cards disposed in the hand area 45*a*, as shown in FIG. 10A, the play points are decreased by one, and the play-points displaying part 48*a* is updated and displayed. Here, in the case where the follower card placed into the field 46*a* has a skill 55 and the invocation condition is satisfied, the skill 55 whose invocation condition is satisfied is invoked. Furthermore, the player terminal 1 transmits card information representing the card placed into the field 46*a* to the server 100. Upon receiving the card information, the server 100 transmits the received card information to the player terminal 1 of the opponent. Accordingly, at the player terminal 1 of the opponent, the card represented by the card information is placed into the field 46*b* of the opponent, and the play-points displaying part 48*b* of the opponent is updated and displayed.

Then, when the turn end button 47 is tapped by the player, the player terminal 1 transmits turn end information indicating the end of the turn to the server 100. Note that, at the player terminal 1, in the case where a card whose skills 55 are invoked on condition of the end of a turn is placed in the field 46*a* or 46*b*, the skills 55 of the card are invoked. Upon receiving the turn end information, the server 100 transmits turn start information for starting an opponent's turn after the end of the player's turn to the player terminal 1 of the opponent, thereby causing the player terminal 1 of the opponent to start a turn.

Then, at the player terminal 1 of the player, an image labelled as "ENEMY TURN", indicating an opponent's turn, is displayed on the display 26, as shown in FIG. 10B. Then, card information representing a card determined through a lottery at the player terminal 1 of the opponent is transmitted to the server 100. Upon receiving the number-of-cards information from the server 100, at the player terminal 1, the card is disposed in the hand area 45*b* in an unidentifiable manner on the basis of the number-of-cards information, as shown in FIG. 10C. Note that, at the end of a turn, usually, one card is determined through a lottery; however, only in the first turn for the player who plays second, two cards are determined through lotteries. Furthermore, at the player terminal 1, the play points of the opponent are increased by one, and the play-points displaying part 48*b* is updated and displayed.

Then, when the opponent finishes the turn without playing any card in the hand area 45*b*, upon receiving turn start information from the server 100, the player terminal 1 displays an image labelled as "YOUR TURN" on the display 26, indicating a player's turn, as shown in FIG. 11A, and determines an index of a card present in the deck area 44*a* through a lottery. Then, the card determined through the lottery is disposed in the hand area 45*a*, and card information of the determined card is transmitted to the server 100. Furthermore, the player terminal 1 adds one to the play points, and updates and displays the play-points displaying part 48*a* (here, sets the play points to two).

Furthermore, when the player slides and moves a follower card disposed in the field 46*a* to the opponent's leader 41*b*, it is determined that the opponent's leader 41*b* has been attacked with the follower card, and the physical energy 42*b* of the opponent's leader 41*b* is decreased by the attacking ability 56 of the follower card (damage is given). Furthermore, at the player terminal 1, attack information representing the follower card used for the attack and the follower card or the leader 41*b* that has been attacked is transmitted to the server 100. Upon receiving the attack information, the server 100 transmits the attack information to the player terminal 1 of the opponent.

As described above, player's turns and opponent's turns are repeated alternately, and each time the player or the opponent plays a card or performs an attack, information representing the play or attack is transmitted to the server 100, whereby the card battle game proceeds. Furthermore, the outcome is determined when the physical energy 42*a* of the player's leader 41*a* or the physical energy 42*b* of the opponent's leader 41*b* becomes zero, and the card battle game is finished.

Next, the evolution of a follower card will be described. In the card battle game in this embodiment, in the fifth and subsequent turns of the player who plays first and in the fourth and subsequent turns of the player who plays second, it is possible to evolve a follower card by consuming the evolution points 43a or 43b. Note that, as the evolution points 43a or 43b, two points are assigned in the case of the player who plays first, and three points are assigned in the case of the player who plays second.

Figure 12A:
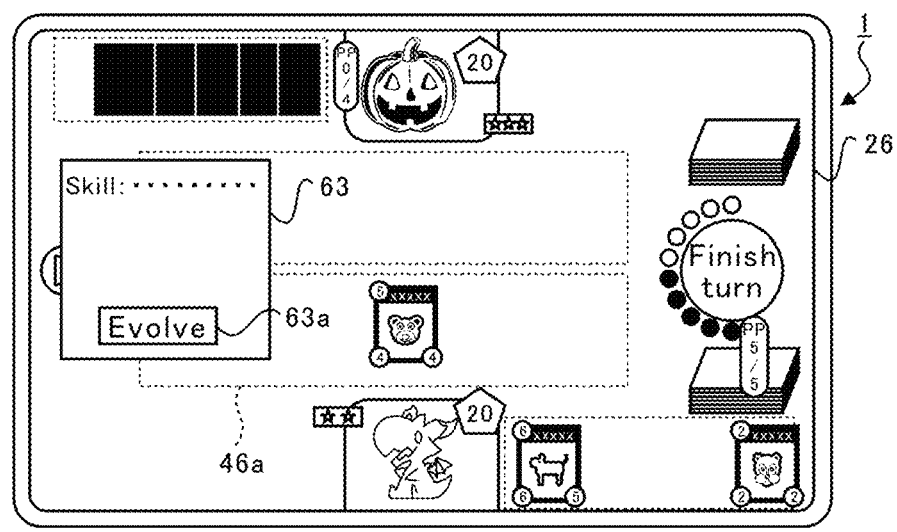
FIG. 12A is a first illustration for explaining an example battle screen at the time of evolution.
Figure 12B:
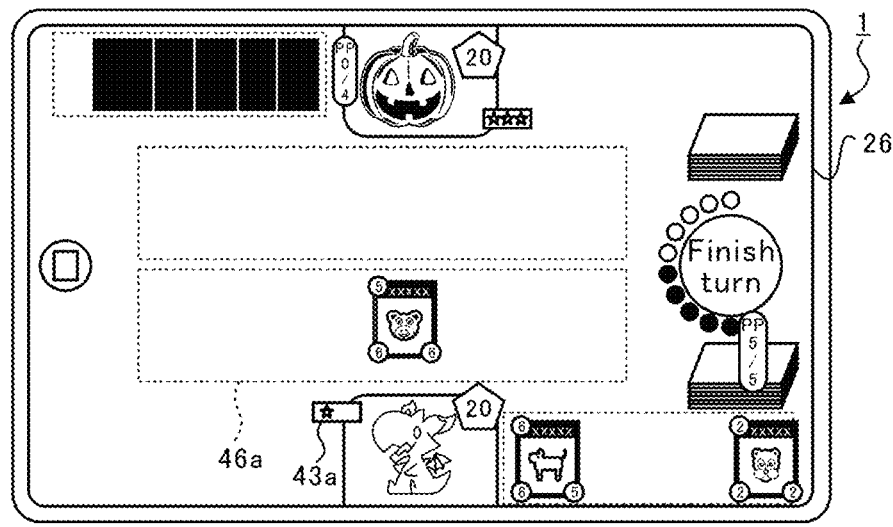
FIG. 12B is a second illustration for explaining an example battle screen at the time of evolution.

FIG. 12A is a first illustration for explaining an example battle screen at the time of evolution. FIG. 12B is a second illustration for explaining an example battle screen at the time of evolution. Suppose, for example, that a follower card that has not been evolved is disposed in the field 46a in the fifth turn for the player who plays first, as shown in FIG. 12A. At this time, when the follower card disposed in the field 46a is tapped, a card detail tab 63 is displayed on the display 26. In the card detail tab 63, the skills 55 of the tapped card are displayed, and an evolution button 63a is also displayed. Note that the evolution button 63a is displayed only in the card detail tab 63 of a follower card, and no evolution button 63a is displayed in the card detail tab 63 of a spell card or an amulet card.

The evolution button 63a functions as an operating part for accepting tapping by the player in the case where evolution is possible. When the evolution button 63a is tapped in the case where evolution is possible, the evolution points 43a are decreased and displayed, and the follower card is evolved and displayed, as shown in FIG. 12B. At this time, the attacking ability 56 and the physical energy 57 of the evolved follower card increase, and in the case of a follower card having when_evolved as a skill 55, the ability is invoked. Furthermore, at the player terminal 1, evolution information representing the evolved follower card is transmitted to the server 100. Upon receiving the evolution information, the server 100 transmits the evolution information to the player terminal 1 of the opponent.

Next, fusion will be described. With fusion as a skill 55, a card having fusion set therefor as a skill 55 among the cards disposed in the hand area 45a serves as a base card, and the base card is enhanced by fusing, as a material card, a card disposed in the hand area 45a and satisfying a preset condition.

Figure 13A:
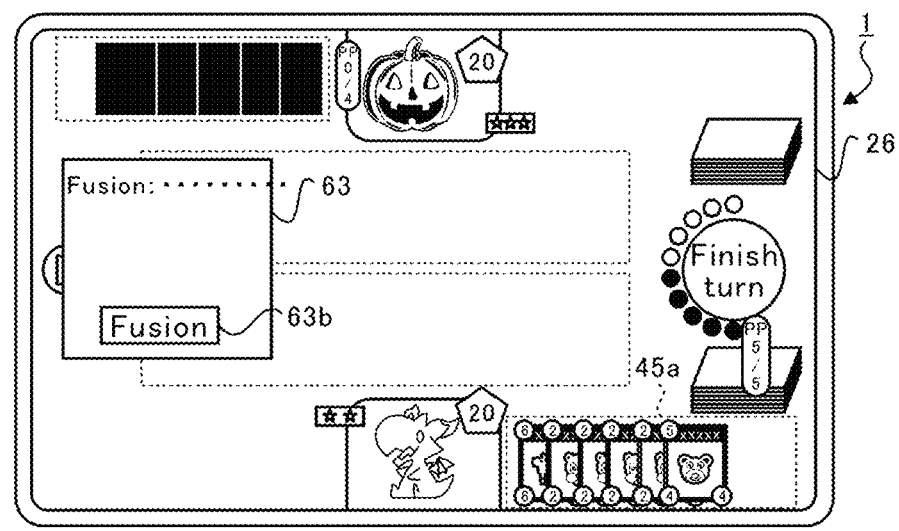
FIG. 13A is a first illustration for explaining an example battle screen at the time of fusion.
Figure 13B:
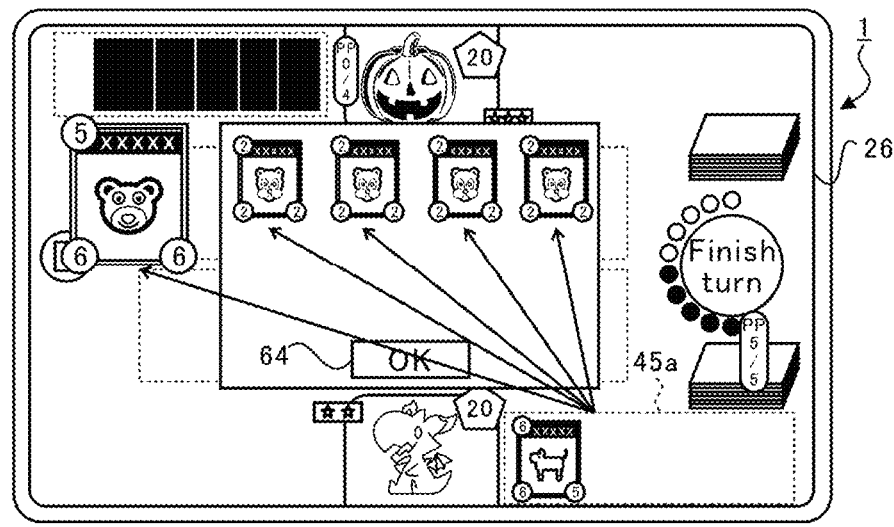
FIG. 13B is a second illustration for explaining an example battle screen at the time of fusion.
Figure 13C:
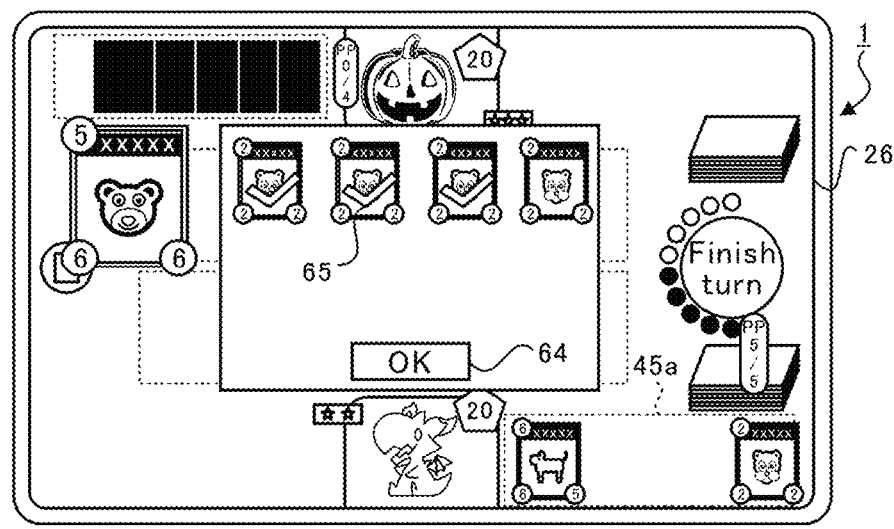
FIG. 13C is a third illustration for explaining an example battle screen at the time of fusion.
Figure 14A:
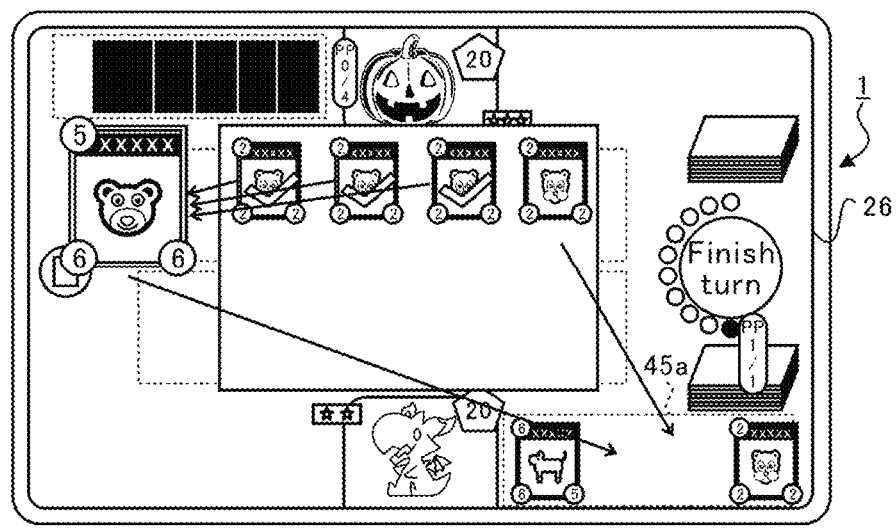
FIG. 14A is a fourth illustration for explaining an example battle screen at the time of fusion.
Figure 14B:
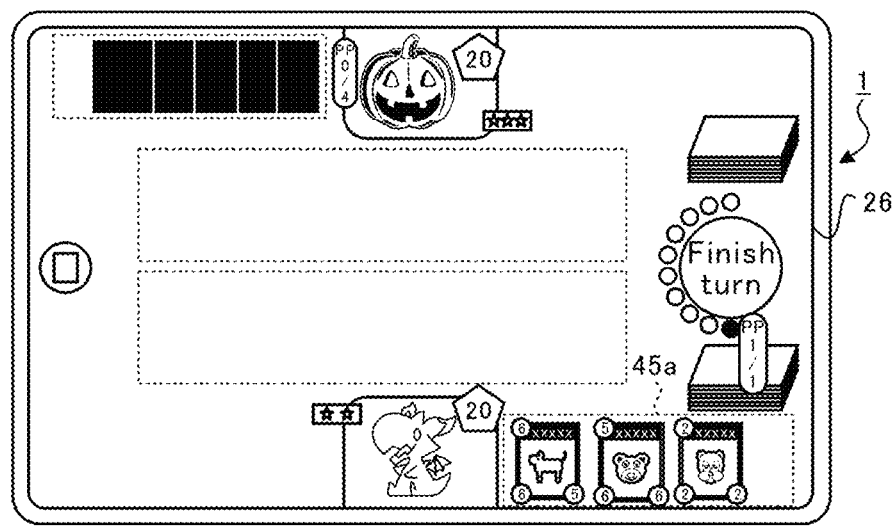
FIG. 14B is a fifth illustration for explaining an example battle screen at the time of fusion.

FIG. 13A is a first illustration for explaining an example battle screen at the time of fusion. FIG. 13B is a second illustration for explaining an example battle screen at the time of fusion. FIG. 13C is a third illustration for explaining an example battle screen at the time of fusion. FIG. 14A is a fourth illustration for explaining an example battle screen at the time of fusion. FIG. 14B is a fifth illustration for explaining an example battle screen at the time of fusion.

Suppose, for example, that there is a card having fusion set therefor as a skill 55 among the cards disposed in the hand area 45a, as shown in FIG. 13A. At this time, when the card having fusion set therefor as a skill 55 is tapped, a card detail tab 63 is displayed on the display 26. In the card detail tab 63, the skill 55 of the tapped card is displayed, and a fusion button 63b is displayed.

The fusion button 63b functions as an operating part for accepting tapping by the player in the case where fusion is possible. When the fusion button 63b is tapped in the case where fusion is possible, the player terminal 1 extracts cards serving as candidates for a material card as material candidate cards from among the cards disposed in the hand area 45a. Note that a card having fusion set therefor as a skill 55 also has set therefor a condition for serving as a material card. Therefore, the player terminal 1 extracts material candidate cards on the basis of the condition for serving as a material card.

Then, at the player terminal 1, the base card is moved from the hand area 45a and is displayed on the left side of the display 26, and the extracted material candidate cards are moved from the hand area 45a and are displayed at the center of the display 26, as shown in FIG. 13B. Furthermore, at the player terminal 1, an OK button 64 is displayed under the material candidate cards.

The material candidate cards displayed on the display 26 function as operating parts for accepting tapping by the player. Furthermore, check marks 65 are added to material candidate cards tapped by the player, as shown in FIG. 13C. Then, when the OK button 64 is tapped, the material candidate cards to which the check marks 65 are added are determined as material cards. Then, effects are displayed such that the material candidate cards having no check marks 65 added thereto are moved to the hand area 45a and such that the material cards are fused with the base card, as shown in FIG. 14A. Then, the base card is moved to the hand area 45a, as shown in FIG. 14B. Furthermore, at the player terminal 1, when the OK button 64 is tapped, fusion information representing the base card and the material cards is transmitted to the server 100. Upon receiving the fusion information, the server 100 transmits the fusion information to the player terminal 1 of the opponent. Note that the material cards enter a state of being neither destructed nor vanished, and do not appear in the subsequent proceeding of the game.

Figure 15A:
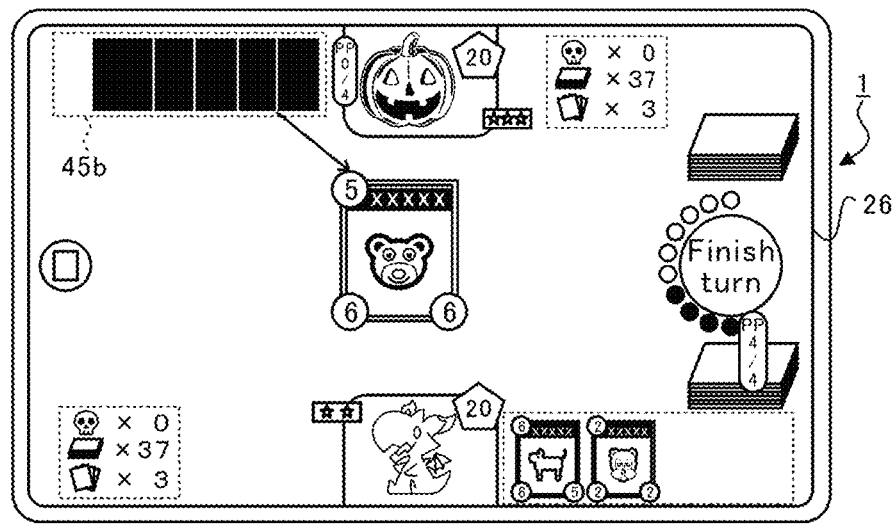
FIG. 15A is a first illustration for explaining an example case where an opponent has invoked fusion.
Figure 15B:
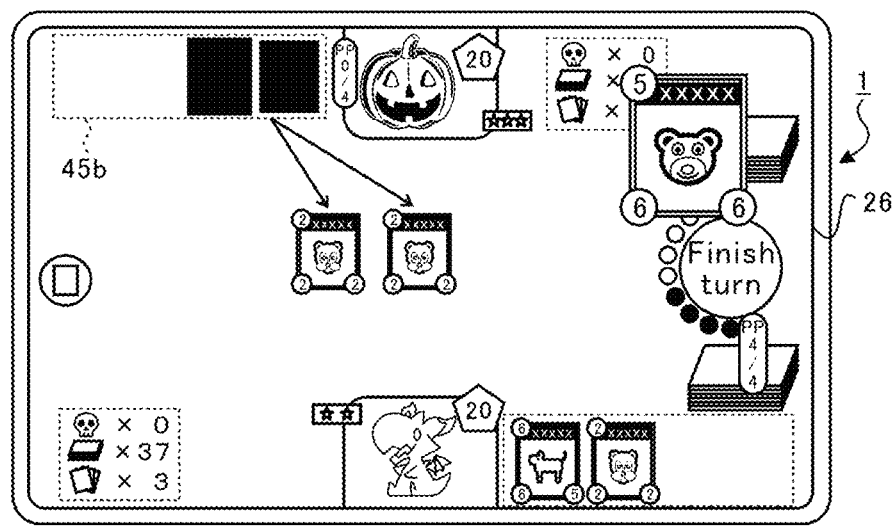
FIG. 15B is a second illustration for explaining an example battle screen in the case where an opponent has invoked fusion.
Figure 15C:
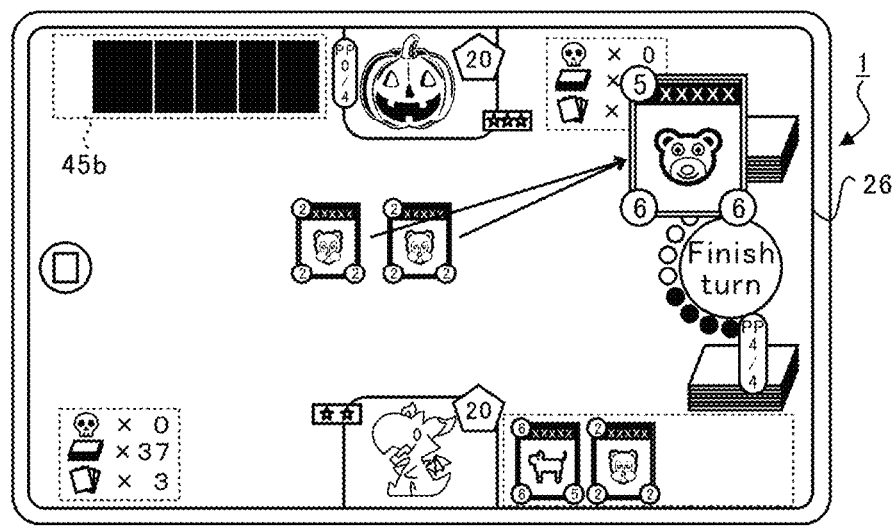
FIG. 15C is a third illustration for explaining an example battle screen in the case where an opponent has invoked fusion.
Figure 16A:
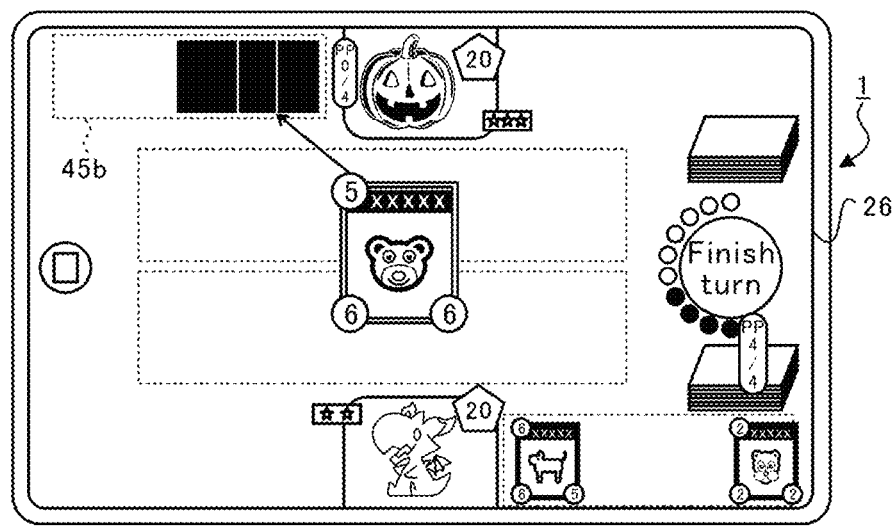
FIG. 16A is a fourth illustration for explaining an example battle screen in the case where an opponent has invoked fusion.
Figure 16B:
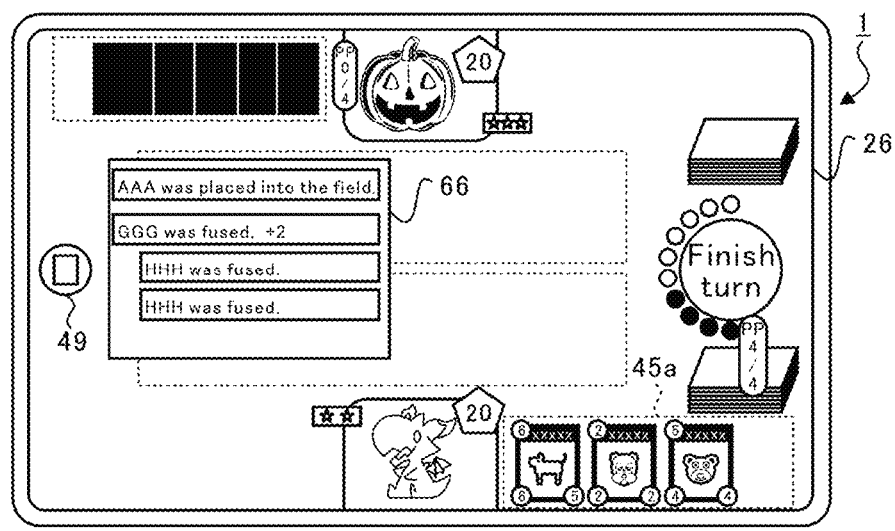
FIG. 16B is an illustration for explaining an example battle log after fusion.

FIG. 15A is a first illustration for explaining an example case where the opponent has invoked fusion. FIG. 15B is a second illustration for explaining an example battle screen in the case where the opponent has invoked fusion. FIG. 15C is a third illustration for explaining an example battle screen in the case where the opponent has invoked fusion. FIG. 16A is a fourth illustration for explaining an example battle screen in the case where the opponent has invoked fusion. FIG. 16B is an illustration for explaining an example battle log after fusion.

When the opponent has invoked fusion, fusion information is transmitted from the server 100 to the player terminal 1, as described above. Upon receiving the fusion information, the player terminal 1 moves one of the cards disposed in the hand area 45b to the center of the display 26 as a base card on the basis of the fusion information, as shown in FIG. 15A. At this time, the base card is displayed in a manner identifiable for the player.

Then, at the player terminal 1, the base card is moved to the top right of the display 26, and some of the cards disposed in the hand area 45b are displayed side by side at the center of the display 26 as material cards on the basis of the fusion information, as shown in FIG. 15B. At this time, the material cards are displayed in a manner identifiable for the player.

Furthermore, at the player terminal 1, after an effect is displayed such that the material cards are fused with the base card, as shown in FIG. 15C, the base card is moved to and displayed in the hand area 45b, as shown in FIG. 16A. At this time, the base card is displayed in a manner unidentifiable for the player.

Furthermore, when the battle log button 49 is tapped, a battle log 66 shown in FIG. 16B is displayed on the display 26. At this time, in the case where cards having fusion set therefor as skills 55 have been fused, the base card (the card "GGG" in the figure), the material card (the card "HHH" in the figure), and the number of cards fused ("+2" in the figure) are displayed in an identifiable manner, as shown in FIG. 16B.

FIG. 17 is a figure for explaining example effects of fusion as a skill 55. Note that the effects of fusion shown in FIG. 17 are merely examples, and other effects may be exhibited. As opposed to the other abilities (attacking ability, defensive ability, skills 55 other than fusion, etc.) that are referred to when a card is disposed in the field 46a or 46b, fusion is a skill (ability) that is referred to when a card is disposed in the hand area 45a. For example, as dictated in example 1 in FIG. 17, fusion confers the following effects as a fanfare: X damage points (X is the number of cards fused) is given to a follower card placed in the opponent's field 46b; X cards of the machine type or the nature type are randomly added from the deck in the deck area 44a to the hand; and if cards of the machine type or the nature type have been fused, the costs of those cards are decreased by three.

Furthermore, as dictated in example 2 in FIG. 17, fusion confers the following effects as a fanfare: a card is changed to a card "XXX" when a follower card is fused; a card is changed to a card "YYY" when a spell card is fused; and a card is changed to a card "ZZZ" when an amulet card is fused.

Furthermore, as dictated in example 3 in FIG. 17, fusion confers, as a fanfare, the effect of adding X to the attacking ability 56 and adding X to the physical energy 57 of a follower card in the hand (X is the number of cards fused).

Furthermore, as dictated in example 4 in FIG. 17, fusion confers, as a fanfare, the effect of recovering the physical energy 42a of the player's leader 41a by X (X is the number of cards fused).

Furthermore, as dictated in example 5 in FIG. 17, fusion confers, as a fanfare, the effect of giving X damage points (X is the number of cards fused) to the opponent's leader 41b.

Furthermore, as dictated in example 6 in FIG. 17, fusion confers the following effects as a fanfare: a card with the card name "DDD" is placed into the field 46a; another card with the card name "EEE" is placed into the field 46a when two or more cards have been fused; and another card with the card name "FFF" is placed into the field 46a when five or more cards have been fused.

As described above, in the information processing system S, in a card battle game, a card disposed in the hand area 45a is used as a base card, and a card disposed in an area other than the field 46a (the hand area 45a) is fused with the base card as a material card, whereby the ability of the base card is enhanced. Thus, various strategies are conceivable, such as whether to enhance the ability of a base card at the cost of losing a material card disposed in the hand area 45a or just playing cards without performing fusion. This serves to enhance strategic intricacy in the card battle game.

Furthermore, although cards disposed in the hand area 45a are usually disposed in a manner unidentifiable for the opponent of the battle, by performing fusion, the base card and the material card are identified by the opponent of the battle. This serves to improve strategic intricacy in the card battle game, such as whether or not to perform fusion at the cost of revealing the base card and the material card to the opponent of the battle.

Next, processes at the player terminal 1 and the server 100 for realizing the card battle game described above, as well as functional units that execute these processes, will be described. Note that the following descriptions will be directed in particular to processes relating to the card battle game, and descriptions of other processes will be omitted.

(Functional Units of Player Terminal 1)

Figure 18:
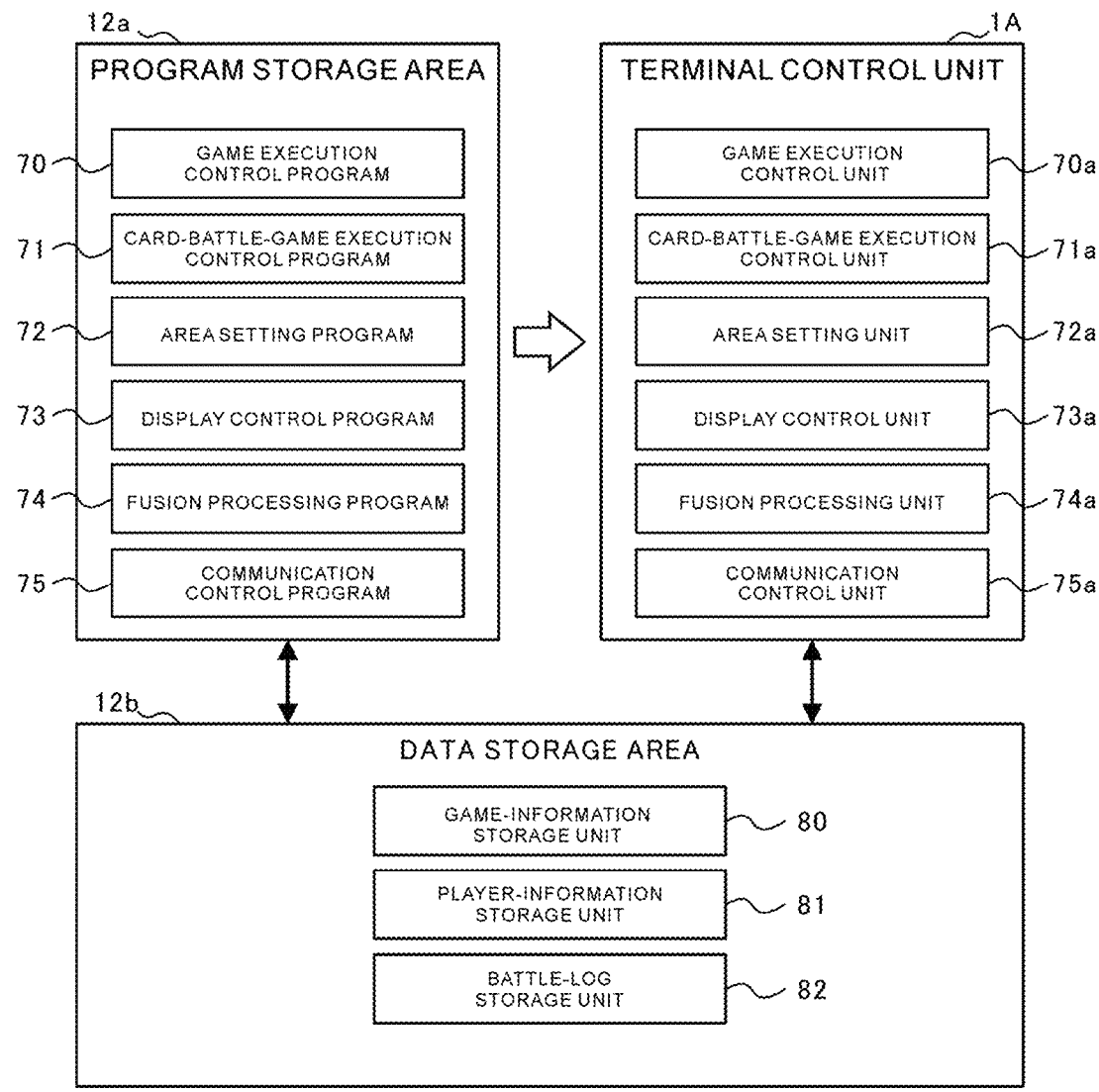
FIG. 18 is a functional block diagram of the player terminal.

FIG. 18 is a functional block diagram of the player terminal 1. In the memory 12 of the player terminal 1, a program storage area 12a and a data storage area 12b are provided. Upon the start of the game, the CPU 10 stores terminal-side game control programs (modules) in the program storage area 12a.

The terminal-side game control programs include a game execution control program 70, a card-battle-game execution control program 71, an area setting program 72, a display control program 73, a fusion processing program 74, and a communication control program 75. Note that the programs listed in FIG. 18 are examples, and the terminal-side game control programs include a large number of other programs.

The CPU 10 runs the individual programs stored in the program storage area 12a to update the data in the individual storage units in the data storage area 12b. Then, by running the individual programs stored in the program storage area 12a, the CPU 10 causes the player terminal 1 (computer) to function as a terminal control unit 1A. The terminal control unit 1A includes a game execution control unit 70a, a card-battle-game execution control unit 71a, an area setting unit 72a, a display control unit 73a, a fusion processing unit 74a, and a communication control unit 75a.

Specifically, the CPU 10 runs the game-execution control program 70, thereby causing the computer to function as the game execution control unit 70a. Similarly, the CPU 10 runs the card-battle-game execution control program 71, the area setting program 72, the display control program 73, the fusion processing program 74, and the communication control program 75, thereby causing the computer to function as the card-battle-game execution control unit 71a, the area setting unit 72a, the display control unit 73a, the fusion processing unit 74a, and the communication control unit 75a, respectively.

In the data storage area 12b, a game-information storage unit 80, a player-information storage unit 81, and a battle-log storage unit 82 are provided as storage units for storing data. Note that the storage units mentioned above are examples, and a large number of other storage units are provided in the data storage area 12b. Furthermore, in the game-information storage unit 80, statuses such as the name 51, the class 52, the type 53, the cost 54, the skills 55, the attacking ability 56, and the physical energy 57, as well as information concerning an illustration, are stored in association with each card.

The game execution control unit 70a controls the proceeding of the game as a whole. For example, the game execution control unit 70a allows log-in to the game in response to a player's operation and checks whether or not game information of the game as a whole has been updated.

The card-battle-game execution control unit 71a is in charge of control for executing the card battle game. For example, the card-battle-game execution control unit 71a controls the proceeding of the card battle game on the basis of operations input to the player terminal 1, and stores battle logs in the battle-log storage unit 82.

The area setting unit 72a sets areas in which cards are disposed in the card battle game. For example, the area setting unit 72a sets deck areas 44a and 44b in which cards that are not yet used are disposed, hand areas 45a and 45b serving as areas in which hands are disposed, and fields 46a and 46b as areas in which played cards are disposed.

The display control unit 73a controls the displaying of images that are displayed on the display 26 in accordance with player's operations and the proceeding of the game.

The fusion processing unit 74a executes processing such as fusing a material card with a base card when fusion is invoked as a skill 55 in the card battle game.

The communication control unit 75a sends information to and receives information from the server 100.

(Functional Units of Server 100)

Figure 19:
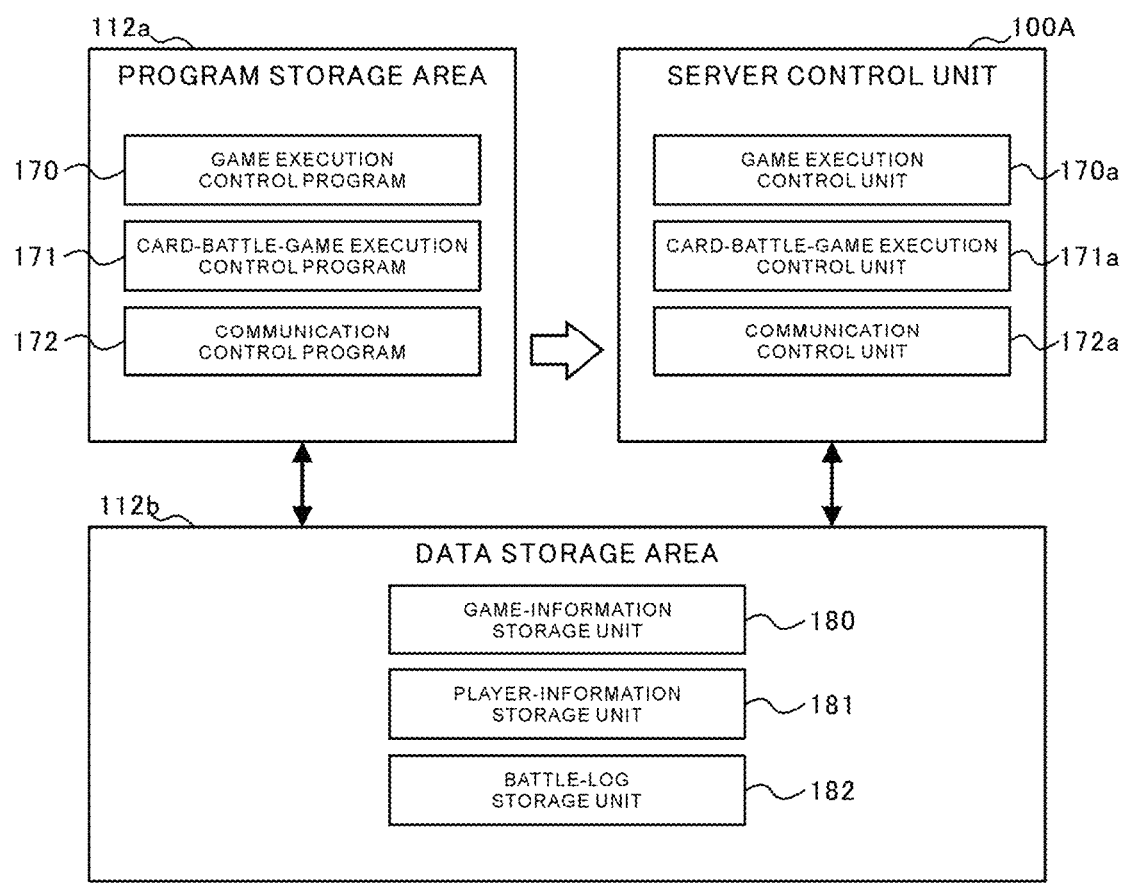
FIG. 19 is a functional block diagram of the server.

FIG. 19 is a functional block diagram of the server 100. In the memory 112 of the server 100, a program storage area 112a and a data storage area 112b are provided. As server-side game control programs, the program storage area 112a stores a game execution control program 170, a card-battle-game execution control program 171, and a communication control program 172. Note that the programs listed in FIG. 19 are examples, and the server-side game control programs include a large number of other programs.

The CPU 110 runs the individual programs stored in the program storage area 112a to update the data in the individual storage units in the data storage area 112b. Then, by running the individual programs stored in the program storage area 112a, the CPU 110 causes the server 100 (computer) to function as a server control unit 100A. The server control unit 100A includes a game execution control unit 170a, a card-battle-game execution control unit 171a, and a communication control unit 172a.

Specifically, the CPU 110 runs the game execution control program 170, thereby causing the computer to function as the game execution control unit 170a. Similarly, the CPU 110 runs the card-battle-game execution control program 171 and the communication control program 172, thereby causing the computer to function as the card-battle-game execution control unit 171a and the communication control unit 172a, respectively.

In the data storage area 112b, a game-information storage unit 180, a player-information storage unit 181, and a battle-log storage unit 182 are provided as storage units for storing data. Note that the storage units mentioned above are examples, and a large number of other storage units are provided in the data storage area 112b.

The game execution control unit 170a controls the proceeding of the game as a whole. For example, upon receiving log-in information from the player terminal 1, the game execution control unit 170a transmits the player information (deck information, BP, etc.) saved in the player-information storage unit 181 to the player terminal 1 via the communication control unit 172a. Furthermore, in the case where game information concerning the game as a whole has been updated, the game execution control unit 170a reads out the updated game information from the game-information storage unit 180 and transmits the game information to the player terminal 1 via the communication control unit 172a.

The card-battle-game execution control unit 171a is in charge of control for executing the card battle game, and stores battle logs in the battle-log storage unit 182. The communication control unit 172a sends information to and receives information from the player terminal 1.
(Communication Processes Between Player Terminal 1 and Server 100)

Figure 20:
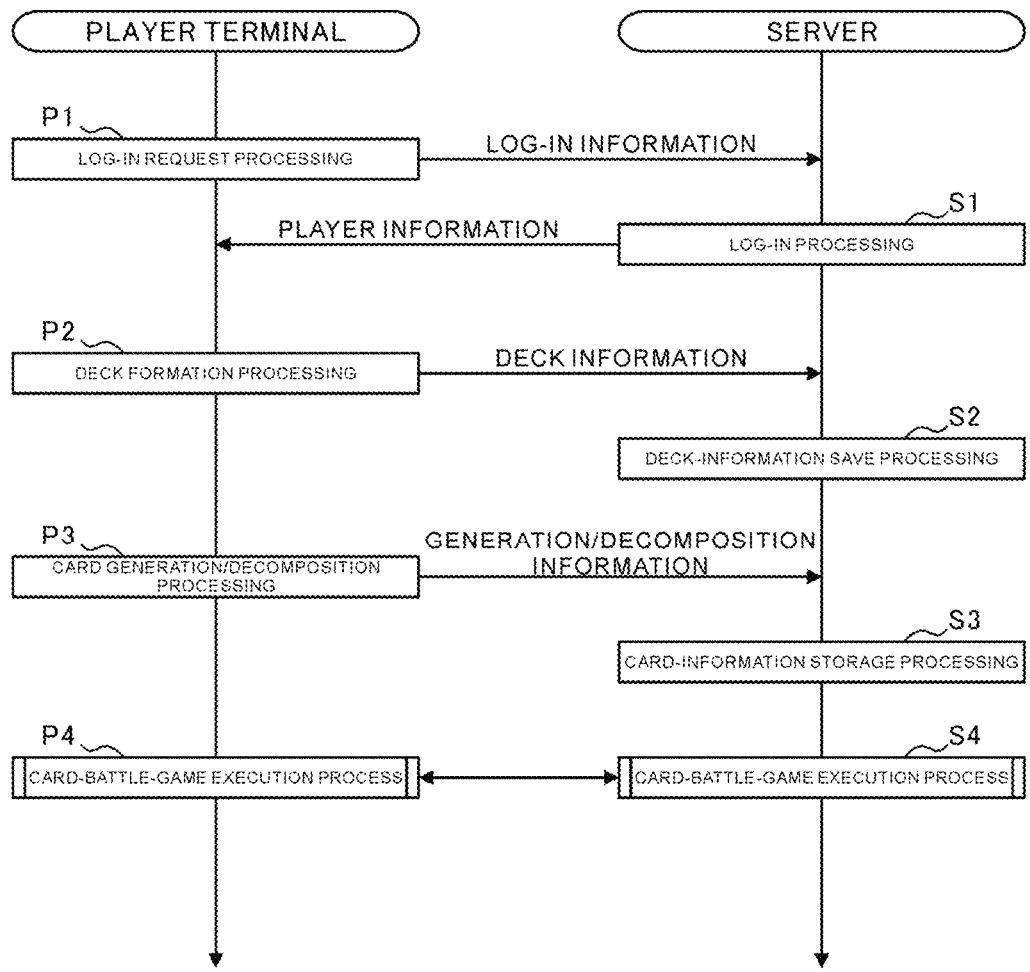
FIG. 20 is a sequence chart for explaining processes at the player terminal and the server.

FIG. 20 is a sequence chart for explaining processes at the player terminal 1 and the server 100. In the following description, processing steps at the player terminal 1 will be signified by Pn (n is an arbitrary integer). Furthermore, processing steps at the server 100 will be signified by Sn (n is an arbitrary integer). When an operation for starting the game has been input by the player, the game execution control unit 70a of the player terminal 1 executes log-in request processing. In the log-in request processing, log-in information is transmitted to the server 100 via the communication control unit 75a under the control of the game execution control unit 70a (P1). Upon receiving the log-in information via the communication control unit 172a, the game execution control unit 170a of the server 100 identifies the player ID associated with the log-in information and executes log-in processing (S1). Here, the game execution control unit 170a reads the player information corresponding to the identified player ID from the player-information storage unit 181 and transmits the player information to the player terminal 1 via the communication control unit 172a.

When the save tab 35 is tapped after possessed cards enter a tentatively registered state via the deck formation screen shown in FIGS. 3D and 4A, the game execution control unit 70a of the player terminal 1 executes deck formation processing to store the deck information in the player-information storage unit 81 and to transmit the deck information to the server 100 via the communication control unit 75a (P2). Upon receiving the deck information via the communication control unit 172a, the game execution control unit 170a of the server 100 executes deck-information save processing to store the received deck information in the player-information storage unit 181 in association with the player ID (S2).

When a card is generated or decomposed via the card list screen shown in FIG. 4B or the card generation screen shown in FIG. 4C, the game execution control unit 70a of the player terminal 1 stores generation/decomposition information in the player-information storage unit 81, including generated or decomposed card information, the updated number of coins, possessed card information, etc. Furthermore, the game execution control unit 70a executes card generation/decomposition processing to transmit the generation/decomposition information to the server 100 via the communication control unit 75a (P3).

Upon receiving the generation/decomposition information via the communication control unit 172a, the game execution control unit 170a of the server 100 executes card-information storage process on the basis of the received generation/decomposition information to update the player information associated with the player ID and stored in the player-information storage unit 181 (S3).

Furthermore, when the solo-play selection operating part 30b or the multi-play selection operating part 30c in the menu bar 30 is tapped, various kinds of setting screens are displayed. Furthermore, when settings have been made in the setting screens, the card-battle-game execution control unit 71a transmits start information from the player terminal 1 to the server 100 via the communication control unit 75a and executes a card-battle-game execution process (P4). Upon receiving the start information, the card-battle-game execution control unit 171a of the server 100 determines an opponent and executes a card-battle-game execution process (S4).

Figure 21:
FIG. 21 is a flowchart for explaining an example card-battle-game execution process at the player terminal.

FIG. 21 is a flowchart for explaining an example card-battle-game execution process (P4) at the player terminal 1. Upon the start of the card-battle-game execution process, the card-battle-game execution control unit 71a transmits deck information that is used in the card battle game to the server 100 via the communication control unit 75a (P4-1). The area setting unit 72a executes area setting processing to set areas in which cards are disposed in the battle screen (P4-2). Here, for example, the area setting unit 72a sets deck areas 44a and 44b in which cards that are not yet used are disposed, hand areas 45a and 45b in which hands are disposed, and fields 46a and 46b in which cards, etc. played from among cards displayed in the hand area 45b are disposed. Note that the area setting unit 72a also performs settings other than the settings of the areas in which cards are disposed in the battle screen.

The display control unit 73a displays whether the player plays first or second on the display 26 on the basis of initial information (play order information) transmitted from the server 100, as shown in FIG. 8A (P4-4). Then, the card-battle-game execution control unit 71a executes initial-card determination processing to determine initial cards on the basis of initial information (change information) (P4-5). Here, on the basis of the initial information (play order information), the display control unit 73*a* disposes three initial candidate cards in the initial-card display area 60 and displays the change display area 61 for disposing cards to be changed on the display 26, as shown in FIG. 8B. Furthermore, when the OK button 62 is tapped by the player, the card-battle-game execution control unit 71*a* returns cards moved to the change display area 61 to the deck area 44*a*, and determines, as initial cards, the unchanged initial candidate cards and the number of change candidate cards corresponding to the number of the changed initial candidate cards, as shown in FIG. 8C. Furthermore, the card-battle-game execution control unit 71*a*, via the communication control unit 75*a*, transmits initial card information representing the initial cards to the server 100, and receives number-of-cards information of the opponent (P4-6).

The display control unit 73*a* displays a battle screen on the display 26 on the basis of the areas set in P4-2, as shown in FIG. 9A, disposes the determined initial cards in an identifiable manner in the hand area 45*a*, and disposes three cards in an unidentifiable manner in the hand area 45*b* on the basis of the received number-of-cards information of the opponent (P4-7).

Then, the card-battle-game execution control unit 71*a* checks whether or not the current turn is a player's turn on the basis of the play order information or turn start information transmitted from the server 100 (P4-8). Furthermore, if the current turn is a player's turn (YES in P4-8), the card-battle-game execution control unit 71*a* executes an own-turn control process (P5). Meanwhile, if the current turn is not a player's turn, i.e., if the current turn is an opponent's turn (NO in P4-8), the card-battle-game execution control unit 71*a* executes an opponent's-turn control process (P6).

Furthermore, the card-battle-game execution control unit 71*a* returns the process to P4-8 if the outcome has not been determined (NO in P4-9). Meanwhile, if the outcome has been determined (YES in P4-9), the card-battle-game execution control unit 71*a* executes card-battle-game end processing for finishing the card battle game (P4-10), and finishes the card-battle-game execution process.

Figure 22:
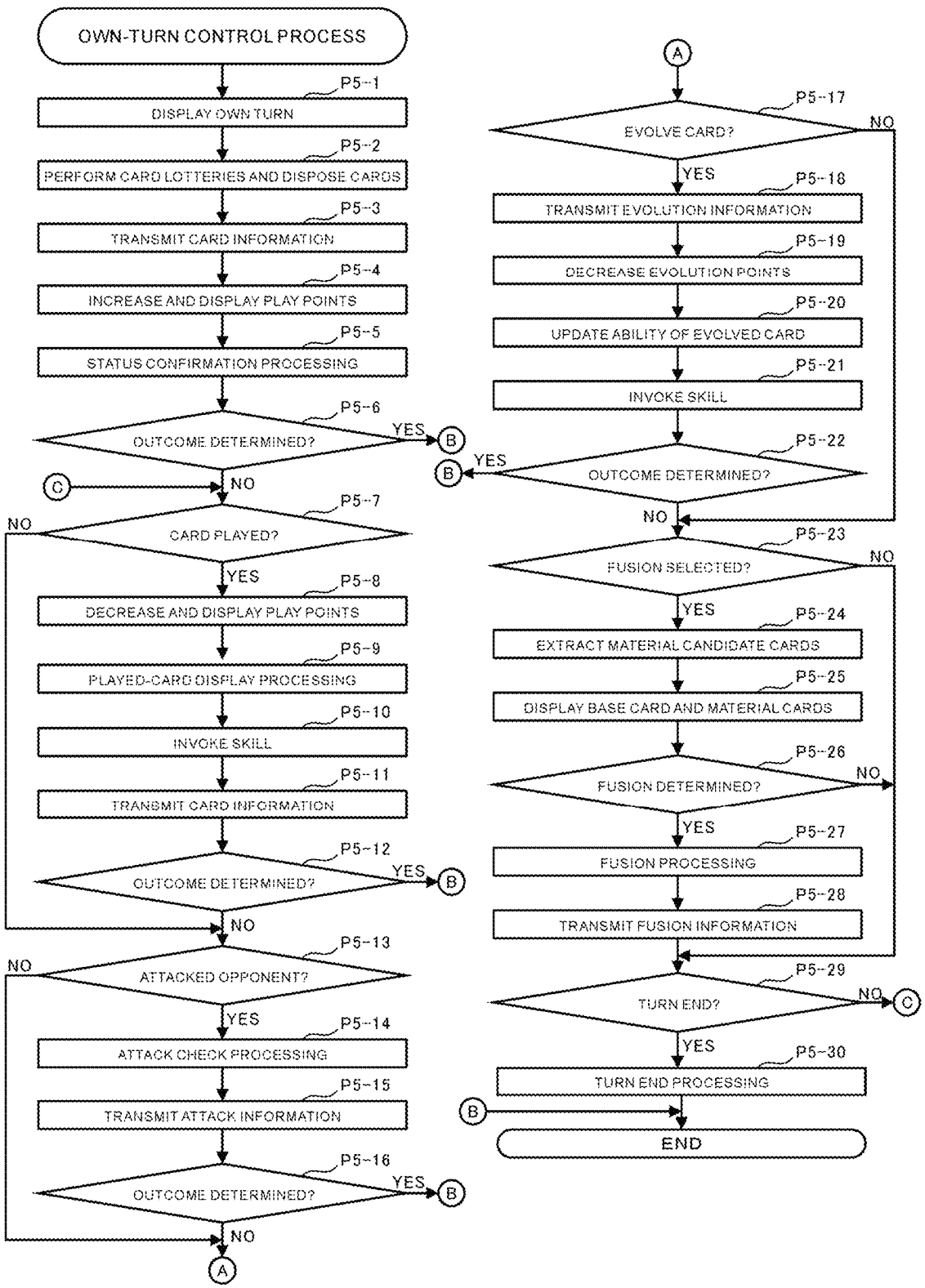
FIG. 22 is a flowchart for explaining an example own-turn control process at the player terminal.

FIG. 22 is a flowchart for explaining an example own-turn control process (P5) at the player terminal 1. Upon the start of a player's turn, the display control unit 73*a* displays an image labelled as "YOUR TURN" on the display 26, indicating a player's turn, as shown in FIG. 9B (P5-1). The card-battle-game execution control unit 71*a* determines a card present in the deck area 44*a* through a lottery, and the display control unit 73*a* disposes the determined card in an identifiable manner in the hand area 45*a* (P5-2). Furthermore, the communication control unit 75*a* transmits card information of the determined card to the server 100 (P5-3). Furthermore, the card-battle-game execution control unit 71*a* increases the play points by one, and the display control unit 73*a* updates and displays the play-points displaying part 48*a* (P5-4).

Furthermore, the card-battle-game execution control unit 71*a* executes status confirmation processing to confirm whether or not there is any skill 55 that is invoked upon the start of a player's turn and to invoke the skill 55 that is invoked upon the start of a player's turn, if any (P5-5). Then, through the status confirmation processing, the card-battle-game execution control unit 71*a* checks whether or not the physical energy 42*a* of the player's leader 41*a* or the physical energy 42*b* of the opponent's leader 41*b* has become zero, i.e., whether or not the outcome has been determined (P5-6). The own-turn control process is finished in the case where the outcome has been determined (YES in P5-6), whereas the process proceeds to P5-7 in the case where the outcome has not been determined (NO in P5-6).

If a card has been played (YES in P5-7), i.e., if a card disposed in the hand area 45*a* has been placed into the field 46*a*, the card-battle-game execution control unit 71*a* decreases the play points by the cost 54 of the card placed into the field 46*a*, and the display control unit 73*a* updates and displays the play-points displaying part 48*a*, as shown in FIG. 10A (P5-8). Furthermore, if the played card is a follower card or an amulet card, the display control unit 73*a* displays that card in the field 46*a* (P5-9). Furthermore, the card-battle-game execution control unit 71*a* confirms the skills 55 of the played card, and invokes a skill 55 (fanfare) that is invoked when the card is placed into the field 46*a*, if any (P5-10). The communication control unit 75*a* transmits card information of the played card to the server 100 (P5-11). Then, the card-battle-game execution control unit 71*a* determines whether or not the outcome has been determined (P5-12). The own-turn control process is finished in the case where the outcome has been determined (YES in P5-12), whereas the process proceeds to P5-13 in the case where the outcome has not been determined (NO in P5-12).

The card-battle-game execution control unit 71*a* executes attack check processing (P5-14) if a card disposed in the field 46*a* has attacked a follower card or the leader 41*b* of the opponent (YES in P5-13) as a result of a player's operation, the card-battle-game execution control unit 71*a* executes attack check processing (P5-14). In the attack check processing, the physical energy of the attacked follower card or leader 41*b* of the opponent is decreased, and the physical energy of the follower card used to perform the attack is decreased. Furthermore, the display control unit 73*a* executes effect rendering at the time of the attack. Furthermore, the communication control unit 75*a* transmits attack information to the server 100, representing the follower card used to perform the attack as well as the attacked follower card or leader 41*b* of the opponent (P5-15). Then, the card-battle-game execution control unit 71*a* determines whether or not the outcome has been determined (P5-16). The own-turn control process is finished in the case where the outcome has been determined (YES in P5-16), and the process proceeds to P5-17 in the case where the outcome has not been determined (NO in P5-16).

The card-battle-game execution control unit 71*a* determines whether a follower card disposed in the field 46*a* is to be evolved as a result of a player's operation or by means of a skill 55 (P5-17). In the case where a follower card is to be evolved, the communication control unit 75*a* transmits evolution information to the server 100, indicating the follower card to be evolved (P5-18). Furthermore, in the case where the follower card is evolved by using the evolution points 43*a*, the card-battle-game execution control unit 71*a* decreases the evolution points 43*a* by one (P5-19). Furthermore, the card-battle-game execution control unit 71*a* enhances and updates the abilities (e.g., the attacking ability and the physical energy) of the follower card to be evolved (P5-20). Furthermore, the card-battle-game execution control unit 71*a* confirms the skills 55 of the evolved card, and invokes a skill 55 (when_evolved) that is invoked upon evolution, if any (P5-21). Then, the card-battle-game execution control unit 71*a* determines whether or not the outcome has been determined (P5-22). The own-turn control process is finished in the case where the outcome has been determined (YES in P5-22), whereas the process proceeds to P5-23 in the case where the outcome has not been determined (NO in P5-22).

The fusion processing unit 74a determines whether or not fusion of a card disposed in the hand area 45a has been selected as a result of tapping of the fusion button 63b by a player's operation (P5-23). The fusion processing unit 74a uses the card for which fusion has been selected as a base card, and extracts cards that can be fused with the base card as material candidate cards from among the cards disposed in the hand area 45a (P5-24). Then, the display control unit 73a displays the base card and the material candidate cards on the display 26, as shown in FIG. 13B (P5-25).

The display control unit 73a adds check marks 65 to material candidate cards tapped by the player, as shown in FIG. 13C, and the fusion processing unit 74a determines whether fusion has been determined by an operation of the OK button 64 by the player (P5-26). In the case where fusion has been determined (YES in P5-26), the display control unit 73a and the fusion processing unit 74a execute fusion processing (P5-27). In the fusion processing, as shown in FIG. 14A, the display control unit 73a displays effects such that material candidate cards having no check marks 65 added thereto are moved into the hand area 45a and such that the material cards are fused with the base card, and then moves the base card to and displays the base card in the hand area 45a. Furthermore, the fusion processing unit 74a enhances the ability of the base card on the basis of the skills 55 of the base card as well as the number, card types, etc. of the material cards. The communication control unit 75a transmits fusion information representing the base card and the material cards to the server 100 (P5-28).

The card-battle-game execution control unit 71a checks whether or not the player's turn has finished in response to an operation of the turn end button 47 by the player (P5-29). Then, the card-battle-game execution control unit 71a causes the process to return to P5-7 if the player's turn has not finished (NO in P5-29). Meanwhile, if the player's turn has finished (YES in P5-29), the card-battle-game execution control unit 71a executes turn end processing to confirm the skills 55 of the cards disposed in the field 46a, to invoke a skill 55 that is invoked upon the end of a player's turn, if any, and to confirm the outcome (P5-30). Furthermore, the communication control unit 75a transmits turn end information to the server 100, indicating the end of the player's turn. Note that in the case where it is determined that the outcome has been determined in P5-6, P5-12, P5-16, P5-22, or P5-30 described above, the communication control unit 75a transmits outcome information to the server 100, indicating that the outcome has been determined.

Figure 23:
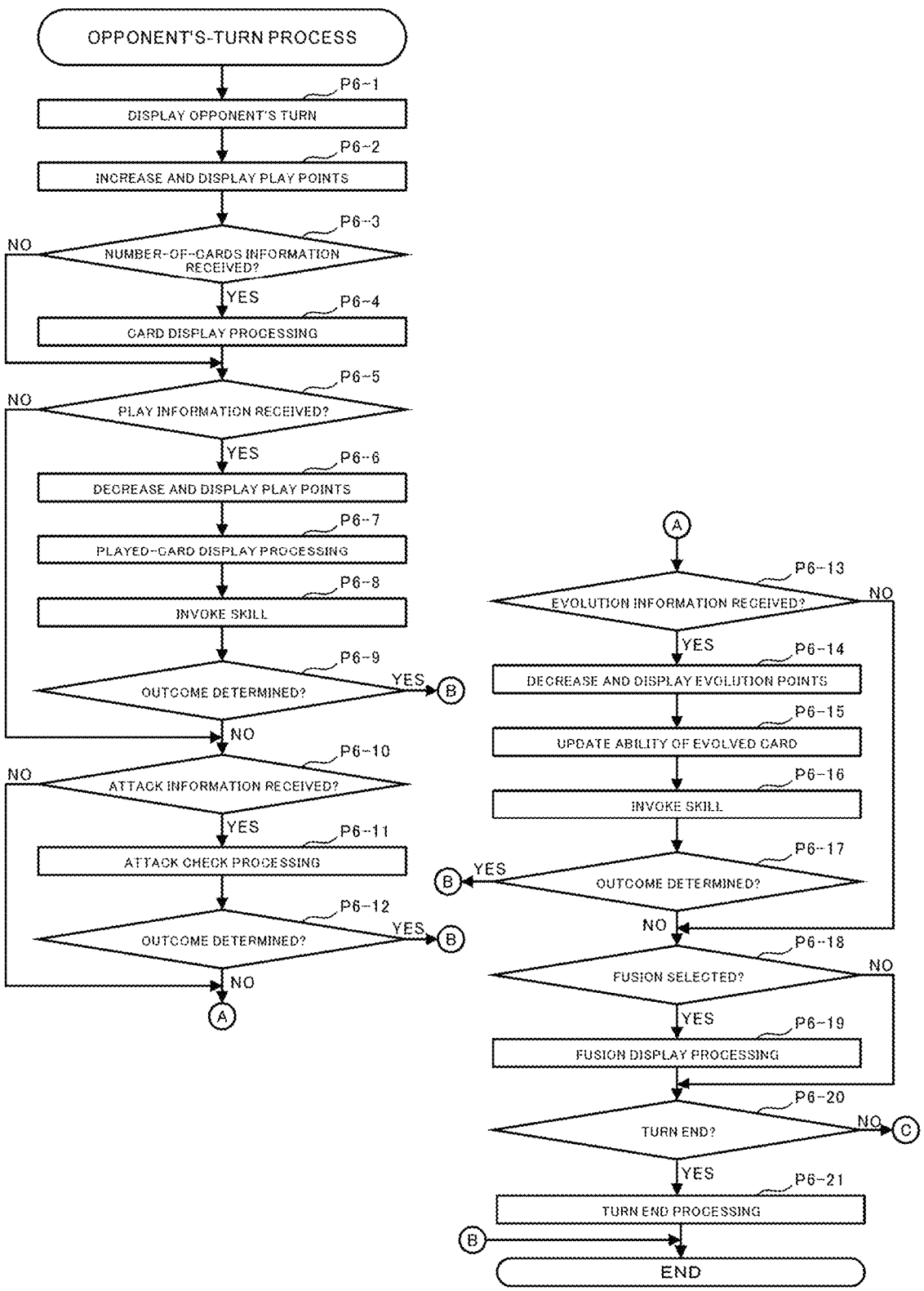
FIG. 23 is a flowchart for explaining an example opponent-turn control process at the player terminal.

FIG. 23 is a flowchart for explaining an example opponent's-turn control process (P6) at the player terminal 1. Upon the start of an opponent's turn, the display control unit 73a displays an image labelled as "ENEMY TURN" on the display 26, indicating an opponent's turn, as shown in FIG. 10B (P6-1). Furthermore, the card-battle-game execution control unit 71a increases the play points of the opponent by one, and the display control unit 73a updates and displays the play-points displaying part 48b (P6-2).

The display control unit 73a determines whether or not number-of-cards information has been received via the communication control unit 75a (P6-3), and in the case where number-of-cards information has been received (YES in P6-3), disposes cards in the hand area 45b in an unidentifiable manner on the basis of the number-of-cards information (P6-4).

The card-battle-game execution control unit 71a checks whether or not play information has been received via the communication control unit 75a (P6-5). In the case where play information has been received (YES in P6-5), the card-battle-game execution control unit 71a decreases the play points by the cost 53 of the played card, and the display control unit 73a updates and displays the play-points displaying part 48b (P6-6). Furthermore, if the played card is a follower card or an amulet card, the display control unit 73a displays that card in the field 46b in an identifiable manner (P6-7). Furthermore, the card-battle-game execution control unit 71a confirms the skills 55 of the played card, and invokes a skill 55 that is to be invoked, if any (P6-8). Then, the card-battle-game execution control unit 71a determines whether or not the outcome has been determined (P6-9). The opponent's-turn process is finished in the case where the outcome has been determined (YES in P6-9), and the process proceeds to P6-10 in the case where the outcome has not been determined (NO in P6-9).

The card-battle-game execution control unit 71a checks whether or not attack information has been received via the communication control unit 75a (P6-10), and executes attack check processing (P6-11) in the case where attack information has been received (YES in P6-10). In the attack check processing, the physical energy of the attacked follower card or leader 41a of the player is decreased, and the physical energy of the follower card used to perform the attack is decreased. Furthermore, the display control unit 73a executes effect rendering at the time of the attack. Then, the card-battle-game execution control unit 71a determines whether or not the outcome has been determined (P6-12). The opponent's-turn process is finished in the case where the outcome has been determined (YES in P6-12), and the process proceeds to P6-13 in the case where the outcome has not been determined (NO in P6-12).

The card-battle-game execution control unit 71a checks whether or not evolution information has been received via the communication control unit 75a (P6-13). In the case where evolution information has been received (YES in P6-13), if the evolution points 43b of the opponent have been consumed, the card-battle-game execution control unit 71a decreases the evolution points 43b, and the display control unit 73a updates and displays the evolution points 43b (P6-14). Furthermore, the card-battle-game execution control unit 71a enhances and updates the abilities (e.g., the attacking ability and the physical energy) of the follower card to be evolved (P6-15), confirms the skills 55 of the evolved card, and invokes a skill 55 to be invoked, if any (P6-16). Then, the card-battle-game execution control unit 71a determines whether or not the outcome has been determined (P6-17). The opponent's-turn process is finished in the case where the outcome has been determined (YES in P6-17), and the process proceeds to P6-18 in the case where the outcome has not been determined (NO in P6-17).

The card-battle-game execution control unit 71a checks whether or not fusion information has been received via the communication control unit 75a (P6-18). Then, in the case where fusion information has been received (YES in P6-18), the display control unit 73a, on the basis of the fusion information, executes effect rendering so as to display the base card and the material cards from the hand area 45b in a manner identifiable for the player and to then fuse the material cards with the base card (P6-19), as shown in FIGS. 15A, 15B, 15C, and 16A. Furthermore, the fusion processing unit 74a enhances the ability of the base card on the basis of the skills 55 of the base card as well as the number, card types, etc. of the material cards.

The card-battle-game execution control unit 71a checks whether or not turn end information has been received via the communication control unit 75a (P6-20). Then, in the case where turn end information has been received (YES in P6-20), the card-battle-game execution control unit 71a executes turn end processing to confirm the skills 55 of the cards disposed in the field 46b, to invoke a skill 55 that is invoked upon the end of an opponent's turn, if any, and to confirm the outcome (P5-22). Note that in the case where it is determined that the outcome has been determined in P6-9, P6-12, P6-17, or P6-21 described above, the communication control unit 75a transmits outcome information to the server 100, indicating that the outcome has been determined.

Figure 24:
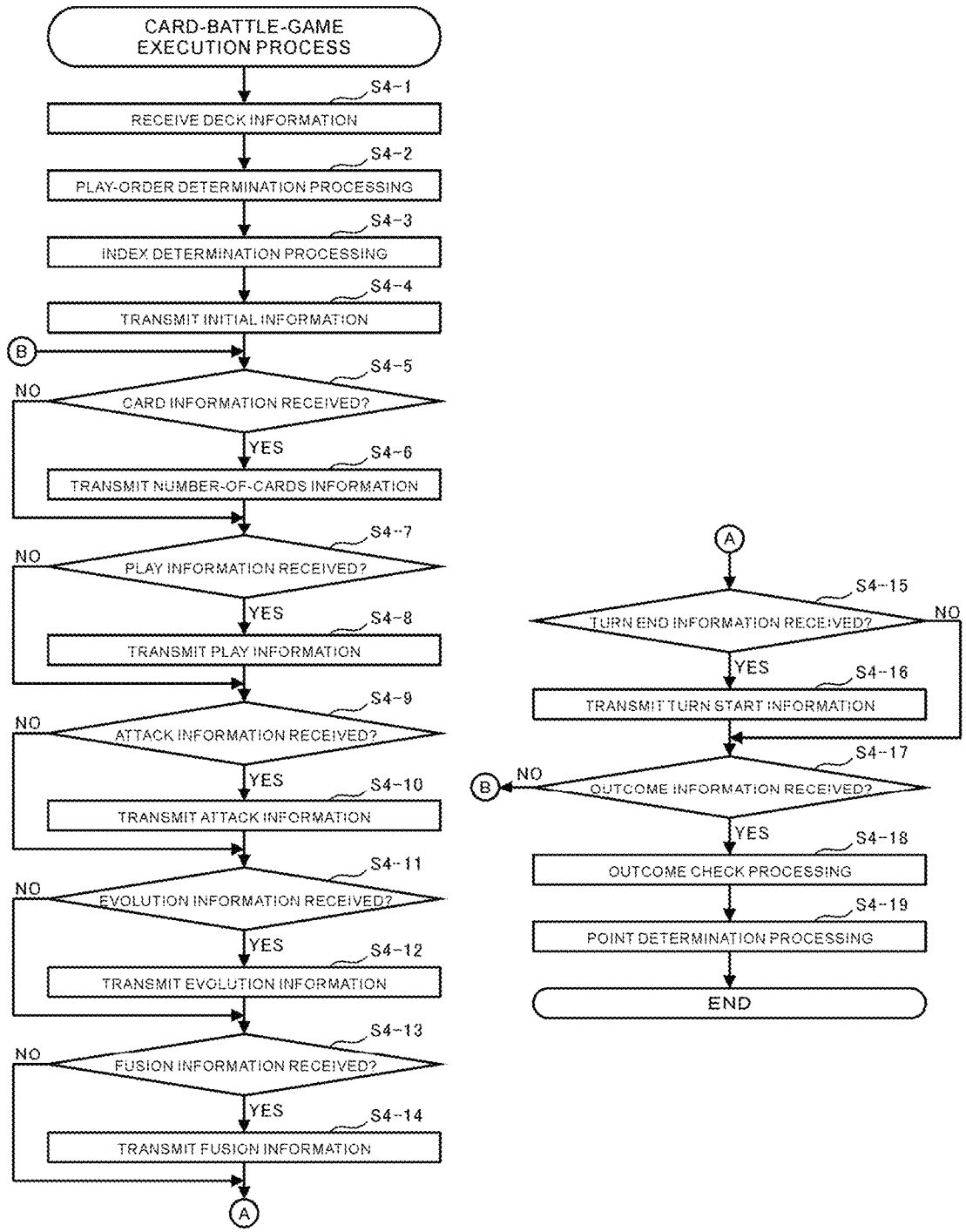
FIG. 24 is a flowchart for explaining an example card-battle-game execution process at the server.

FIG. 24 is a flowchart for explaining an example card-battle-game execution process (S4) at the server 100. Upon the start of the card-battle-game execution process, the communication control unit 172a receives deck information from the player terminals 1 of the player and the opponent (S4-1). Then, the card-battle-game execution control unit 171a determines who plays first and who plays second (S4-2), assigns indices to the cards included in the deck information (S4-3), and transmits initial information to the player terminals 1 of the player and the opponent (S4-4).

The card-battle-game execution control unit 171a checks whether or not card information has been received via the communication control unit 172a (S4-5). In the case where card information has been received (YES in S4-5), the card-battle-game execution control unit 171a transmits number-of-cards information to the player terminal 1 of the opponent of the battle, which is different from the player terminal 1 that has received the card information, via the communication control unit 172a (P4-6).

The card-battle-game execution control unit 171a checks whether or not play information has been received via the communication control unit 172a (S4-7). In the case where play information has been received (YES in S4-7), the card-battle-game execution control unit 171a transmits the play information to the player terminal 1 of the opponent of the battle, which is different from the player terminal 1 that has received the play information, via the communication control unit 172a (S4-8).

The card-battle-game execution control unit 171a checks whether or not attack information has been received via the communication control unit 172a (S4-9). In the case where attack information has been received (YES in S4-9), the card-battle-game execution control unit 171a transmits the attack information to the player terminal 1 of the opponent of the battle, which is different from the player terminal 1 that has received the attack information, via the communication control unit 172a (S4-10).

The card-battle-game execution control unit 171a checks whether or not evolution information has been received via the communication control unit 172a (S4-11). In the case where evolution information has been received (YES in S4-11), the card-battle-game execution control unit 171a transmits the evolution information to the player terminal 1 of the opponent of the battle, which is different from the player terminal 1 that has received the evolution information, via the communication control unit 172a (S4-12).

The card-battle-game execution control unit 171a checks whether or not fusion information has been received via the communication control unit 172a (S4-13). In the case where fusion information has been received (YES in S4-13), the card-battle-game execution control unit 171a transmits the fusion information to the player terminal 1 of the opponent of the battle, which is different from the player terminal 1 that has received the fusion information, via the communication control unit 172a (S4-14).

The card-battle-game execution control unit 171a checks whether or not turn end information has been received via the communication control unit 172a (S4-15). In the case where turn end information has been received (YES in S4-15), the card-battle-game execution control unit 171a transmits the turn end information and turn start information to the player terminal 1 of the opponent of the battle, which is different from the player terminal 1 that has received the turn end information, via the communication control unit 172a (S4-16).

The card-battle-game execution control unit 171a checks whether or not outcome information has been received via the communication control unit 172a (S4-17). In the case where outcome information has been received (YES in S4-17), the card-battle-game execution control unit 171a executes outcome check processing to check whether or not the outcome is correct on the basis of the information that has been received so far (S4-18). Then, in the case where it is determined that the outcome is correct through the outcome check processing, the card-battle-game execution control unit 171a calculates the battle points of the player and the opponent, transmits the battle points to the player terminals 1 via the communication control unit 172a (S4-19), and finishes the card-battle-game execution process.

Although an aspect of an embodiment has been described above with reference to the accompanying drawings, it goes without saying that the present invention is not limited to the embodiment described above. It would be obvious that a person skilled in the art could conceive of various kinds of modifications or improvements within the scope recited in the claims, and it would be understood that those modifications and improvements obviously fall within the technical scope of the present invention.

In the embodiment described above, when fusion is executed as a skill 55, material cards are deleted; alternatively, material cards may be returned on the hand area 45a or 45b with the abilities of the material cards lowered.

Furthermore, in the embodiment described above, material cards are determined from among cards disposed in the hand area 45a; alternatively, for example, cards disposed outside the field 46a, such as cards disposed in the deck area 44a and cards moved to the graveyard, may be used as material cards. Furthermore, it may be allowed to select cards disposed in a plurality of areas as material cards, such as cards disposed in the hand area 45a and cards disposed in the deck area 44a.

Furthermore, although fusion is necessarily executed in the embodiment described above, whether or not to perform fusion may be determined through a lottery.

Furthermore, in the embodiment described above, in the case where the opponent executes fusion, a base card and material cards are displayed in an identifiable manner; alternatively, partial information concerning the base card and the material cards (e.g., the base card only or the material cards only) may be displayed.

Furthermore, although the above embodiment has been described in the context of an example where the second player is a player of the opponent of the battle, alternatively, the second player may be a computer.

Furthermore, in the embodiment described above, when a card is evolved and when a card is fused, the ability of the card is changed (enhanced). Furthermore, as a specific way of changing the card ability, statuses such as the name 51, the class 52 the type 53, the cost 54, the skill 55, the attacking ability 56, and the physical energy 57, as well as the illustration, etc. may be changed. Furthermore, a card may be configured to be evolved when the card is fused.

Furthermore, although the above embodiment has been described in the context of a digital card game as an example, the game may be any game in which a first player and a second player play a battle by using game media, such as a simulation game. Furthermore, although digital cards have been described as examples of game media, base media, and material media, game media provided in a game, other than digital cards, may be used, such as character, units, and pieces.

Note that, in the embodiment described above, the information processing system S, which is a client-server system, performs the individual information processing steps described above. However, the functions of the server 100 in the embodiment described above may be provided at the player terminals 1. Furthermore, the functions of the player terminals 1 in the embodiment described above may be provided in the server 100.

Furthermore, the programs in the embodiment described above may be stored in a computer-readable storage medium and may be provided in the form of the storage medium. Alternatively, the programs may be provided in the form of a game terminal device or an information processing system including the storage medium. Alternatively, the embodiment described above may be embodied in the form of an information processing method for realizing the individual functions and the steps shown in the flowcharts.

What is claimed is:

1. An information processing system comprising:
    a display device; and
    a computer comprising a central processing unit (CPU), a communication interface, and a memory, the computer being connected to the display device and configured to perform a method comprising:
        setting a first area and a second area as areas in which a first plurality of digital cards of a first player are disposed, the second area being different from the first area;
        setting a third area and a fourth area as areas in which a second plurality of digital cards of a second player are disposed, the fourth area being different from the third area;
        displaying, on a first game screen that is displayed by the display device, the first plurality of digital cards and a portion of the second plurality of digital cards disposed in the first area, the second area, and the fourth area in an identifiable manner;
        displaying, on the first game screen, a portion of the second plurality of digital cards disposed in the third area in an unidentifiable manner;
        setting, using an input/output interface that is provided by the computer, a first digital card disposed in the first area as a first base medium;
        setting, using the input/output interface, a second digital card disposed in an area where the first plurality of digital cards of the first player are disposed as a first material medium, the area being an area other than the second area;
        fusing the first material medium with the first base medium to change an ability of the first base medium, while deleting the first material medium or changing an ability of the first material medium; and
        transmitting, to a hardware server using the communication interface, fusion information regarding fusing the first material medium with the first base medium.

2. The information processing system according to claim 1, wherein the method further comprises:
    setting a first game medium disposed in the third area as a second base medium;
    setting a second game medium disposed in an area where the second plurality of digital cards of the second player are disposed as a second material medium, the area being an area other than the fourth area;
    fusing the second material medium with the second base medium to change an ability of the second base medium while deleting the second material medium or changing an ability of the second material medium; and
    displaying the second base medium and the second material medium in an identifiable manner in response to the second base medium and the second material medium of the second player have been fused.

3. The information processing system according to claim 1,
    wherein a plurality of abilities of the first plurality of digital cards include one or more abilities that are referred to when a game medium is disposed in the second area or the fourth area and one or more abilities that are referred to when the game medium is disposed in the first area or the third area, and
    wherein fusing the first material medium with the first base medium corresponds to an ability that is referred to when the game medium is disposed in the first area.

4. The information processing system according to claim 2,
    wherein a plurality of abilities of the first plurality of digital cards include one or more abilities that are referred to when a game medium is disposed in the second area or the fourth area and one or more abilities that are referred to when the game medium is disposed in the first area or the third area, and
    wherein fusing the first material medium with the first base medium corresponds to an ability that is referred to when the game medium is disposed in the first area.

5. An information processing method comprising:
    setting, by a computer comprising a central processing unit (CPU), a communication interface, and a memory, a first area and a second area as areas in which a first plurality of digital cards of a first player are disposed, the second area being different from the first area;
    setting, by the computer, a third area and a fourth area as areas in which a second plurality of digital cards of a second player are disposed, the fourth area being different from the third area;
    displaying, on a first game screen that is displayed by a display device connected to the computer, the first plurality of digital cards and a portion of the second plurality of digital cards disposed in the first area, the second area, and the fourth area in an identifiable manner;
    displaying, on the first game screen, a portion of the second plurality of digital cards disposed in the third area in an unidentifiable manner;
    setting, using an input/output interface that is provided by the computer, a first digital card disposed in the first area as a first base medium;
    setting, using the input/output interface, a second digital card disposed in an area where the first plurality of digital cards of the first player are disposed as a first material medium, the area being an area other than the second area;
    fusing, by the computer, the first material medium with the first base medium to change an ability of the first base medium while deleting the first material medium or changing an ability of the first material medium; and transmitting, to a hardware server using the communication interface of the computer, fusion information regarding fusing the first material medium with the first base medium.

6. A non-transitory computer readable medium storing a program causing a computer to perform a method comprising:

setting a first area and a second area as areas in which a first plurality of digital cards of a first player are disposed, the second area being different from the first area;

setting a third area and a fourth area as areas in which a second plurality of digital cards of a second player are disposed, the fourth area being different from the third area;

displaying, on a first game screen that is displayed by a display device connected to the computer, the first plurality of digital cards and a portion of the second plurality of digital cards disposed in the first area, the second area, and the fourth area in an identifiable manner;

displaying, on the first game screen, a portion of the second plurality of digital cards disposed in the third area in an unidentifiable manner;

setting, using an input/output interface that is provided by the computer, a first digital card disposed in the first area as a first base medium;

setting, using the input/output interface, a second digital card disposed in an area where the first plurality of digital cards of the first player are disposed as a first material medium, the area being an area other than the second area;

fusing the first material medium with the first base medium to change an ability of the first base medium while deleting the first material medium or changing an ability of the first material medium; and transmitting, to a hardware server using a communication interface, fusion information regarding fusing the first material medium with the first base medium.

* * * * *